(12) United States Patent
Murakami

(10) Patent No.: US 9,332,190 B2
(45) Date of Patent: May 3, 2016

(54) IMAGE PROCESSING APPARATUS AND IMAGE PROCESSING METHOD

(71) Applicant: CANON KABUSHIKI KAISHA, Tokyo (JP)

(72) Inventor: Tomochika Murakami, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 14/351,749

(22) PCT Filed: Nov. 22, 2012

(86) PCT No.: PCT/JP2012/081017
§ 371 (c)(1),
(2) Date: Apr. 14, 2014

(87) PCT Pub. No.: WO2013/081086
PCT Pub. Date: Jun. 6, 2013

(65) Prior Publication Data
US 2014/0293117 A1    Oct. 2, 2014

(30) Foreign Application Priority Data

Dec. 2, 2011   (JP) ................. 2011-264897

(51) Int. Cl.
*H04N 5/225*    (2006.01)
*H04N 5/232*    (2006.01)
(Continued)

(52) U.S. Cl.
CPC .......... *H04N 5/23296* (2013.01); *G02B 21/365* (2013.01); *G06T 5/50* (2013.01);
(Continued)

(58) Field of Classification Search
CPC .......... H04N 5/23296; H04N 5/23212; H04N 5/23232; H04N 5/2356; G02B 21/365; G06T 5/50; G06T 2200/21; G06T 2207/10056; G06T 2207/10148; G06T 2207/20221
USPC ................ 348/335, 340, 345, 348, 350, 352, 348/207.11, 207.1, 207.99
See application file for complete search history.

(56) References Cited

U.S. PATENT DOCUMENTS 6,571,023 B1   5/2003   Aizawa et al.
7,596,249 B2   9/2009   Bacus et al.
(Continued)

FOREIGN PATENT DOCUMENTS

DE   102010038164 A1   6/2011
JP   H07-021365 A      1/1995
(Continued)

OTHER PUBLICATIONS

International Search Report issued in International Application No. PCT/JP2012/081017 dated Feb. 12, 2013.
(Continued)

*Primary Examiner* — Yogesh Aggarwal
(74) *Attorney, Agent, or Firm* — Fitzpatrick, Cella, Harper & Scinto

(57) ABSTRACT

An image processing apparatus includes: an imaging characteristic acquisition unit that acquires, on the basis of information that designates a depth of field for second image data to be generated, imaging characteristics of a virtual optical system having the designated depth of field; a selection unit that determines, on the basis of the imaging characteristics acquired, an influence range in which an influence exerted onto an image by an object that is spaced apart from the focal position in the optical axis direction is greater than a predetermined condition, and that selects first image data of which focal position is contained within the influence range, from among a plurality of first image data items; and a generation unit that generates the second image data using the first image data selected by the selection unit.

16 Claims, 18 Drawing Sheets

(51) Int. Cl.
 *G02B 21/36* (2006.01)
 *H04N 5/235* (2006.01)
 *G06T 5/50* (2006.01)

(52) U.S. Cl.
 CPC ........ *H04N 5/2356* (2013.01); *H04N 5/23212* (2013.01); *H04N 5/23232* (2013.01); *G06T 2200/21* (2013.01); *G06T 2207/10056* (2013.01); *G06T 2207/10148* (2013.01); *G06T 2207/20221* (2013.01)

(56) References Cited

U.S. PATENT DOCUMENTS

| | | | |
|---|---|---|---|
| 7,732,744 B2 * | 6/2010 | Utagawa | ............. 250/208.1 |
| 7,756,357 B2 | 7/2010 | Yoneyama | |
| 7,925,067 B2 | 4/2011 | Bacus et al. | |
| 8,306,300 B2 | 11/2012 | Bacus et al. | |
| 8,542,291 B2 | 9/2013 | Ohnishi | |
| 2005/0002587 A1 | 1/2005 | Yoneyama | |
| 2006/0045505 A1 | 3/2006 | Zeineh et al. | |
| 2011/0090327 A1 | 4/2011 | Kenny et al. | |
| 2012/0281132 A1 | 11/2012 | Ogura et al. | |
| 2014/0098213 A1 | 4/2014 | Sato et al. | |

FOREIGN PATENT DOCUMENTS

| | | | |
|---|---|---|---|
| JP | H09-081724 A | 3/1997 |
| JP | H09-179998 A | 7/1997 |
| JP | H09-196621 A | 7/1997 |
| JP | H11-295826 A | 10/1999 |
| JP | 2003-141506 A | 5/2003 |
| JP | 2003-141509 A | 5/2003 |
| JP | 2005-037902 A | 2/2005 |
| JP | 2005-518570 A | 6/2005 |
| JP | 2005-266541 A | 9/2005 |
| JP | 2007-067862 A | 3/2007 |
| JP | 2007-128009 A | 5/2007 |
| JP | 2011-133714 A | 7/2011 |
| JP | 2011-211291 A | 10/2011 |
| JP | 2012-005063 A | 1/2012 |
| JP | 2012-065114 A | 3/2012 |
| WO | 2012/063449 A1 | 5/2012 |

OTHER PUBLICATIONS

Jun. 12, 2014 Notification Concerning Transmittal of International Preliminary Report on Patentability concerning International Application No. PCT/JP2012/081017.

Samuel W. Hasinoff and Kiriakos N. Kutulakos, "Light-Efficient Photography", IEEE Transactions on Pattern Analysis and Machine Intelligence, Nov. 2011, pp. 2203-2214, vol. 33, No. 11, IEEE Computer Society.

Aug. 3, 2015 Extended European Search Report concerning corresponding European Patent Application No. 12853829.5.

* cited by examiner

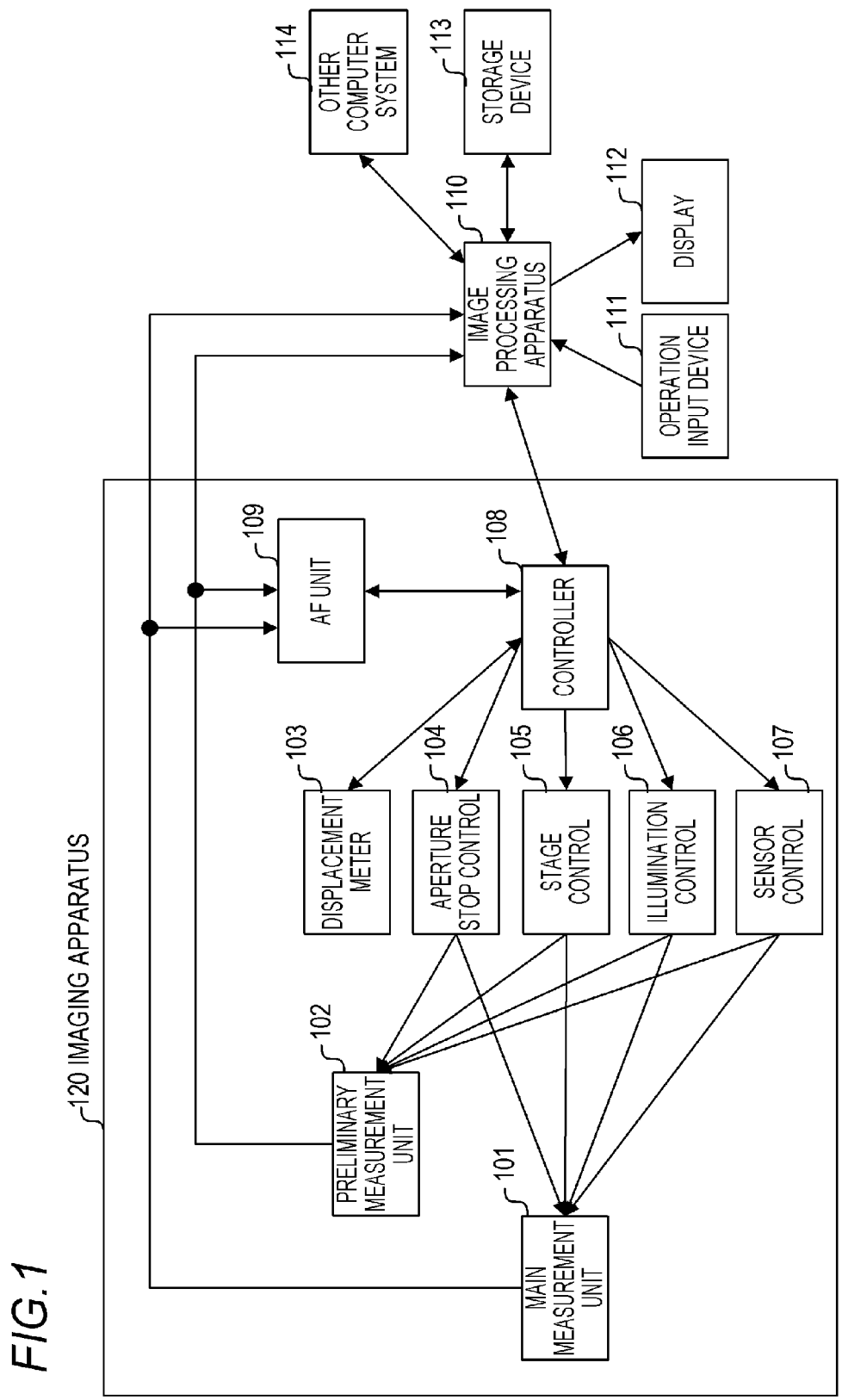

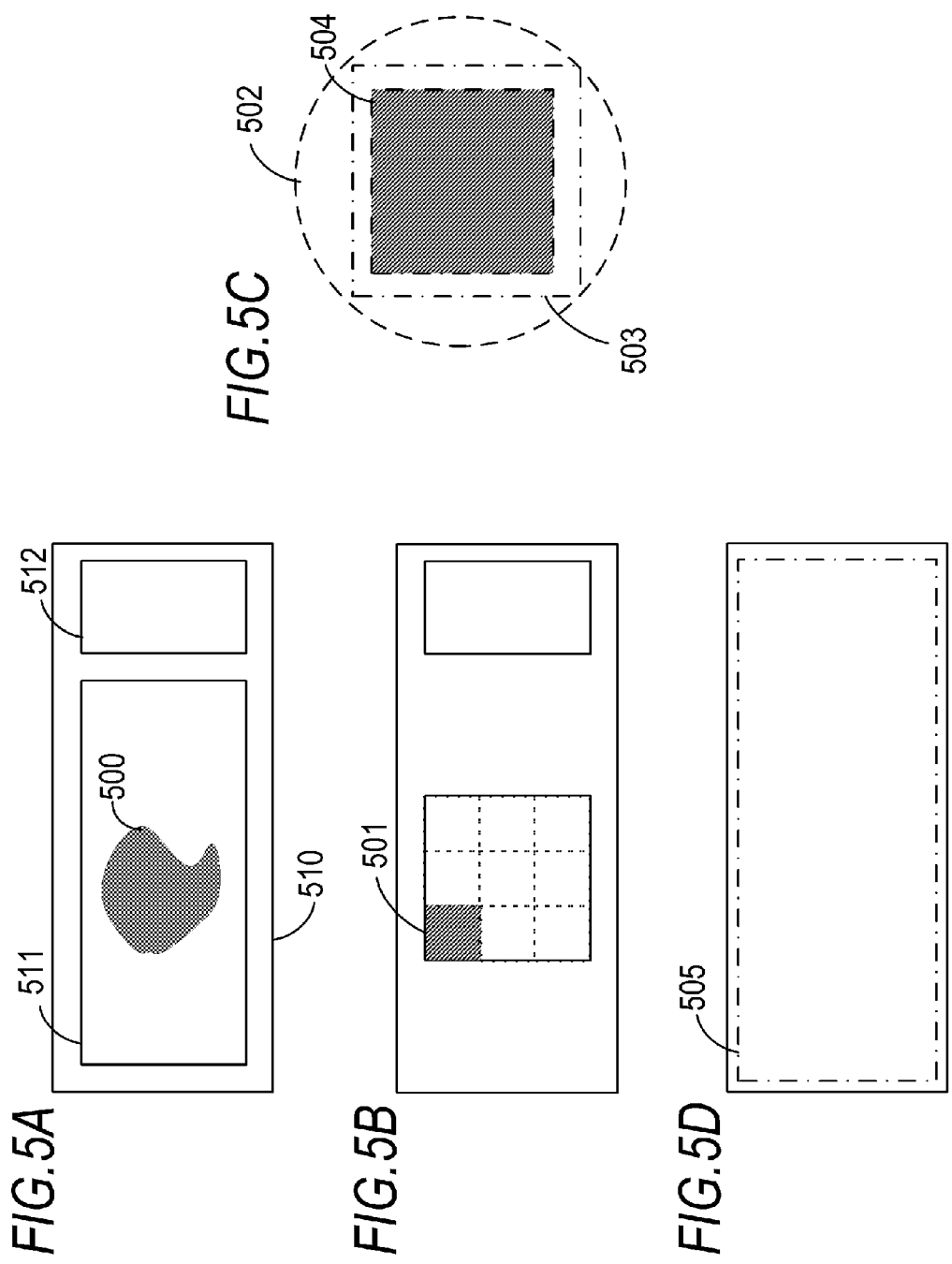

XY STAGE MOVEMENT

Z STAGE MOVEMENT

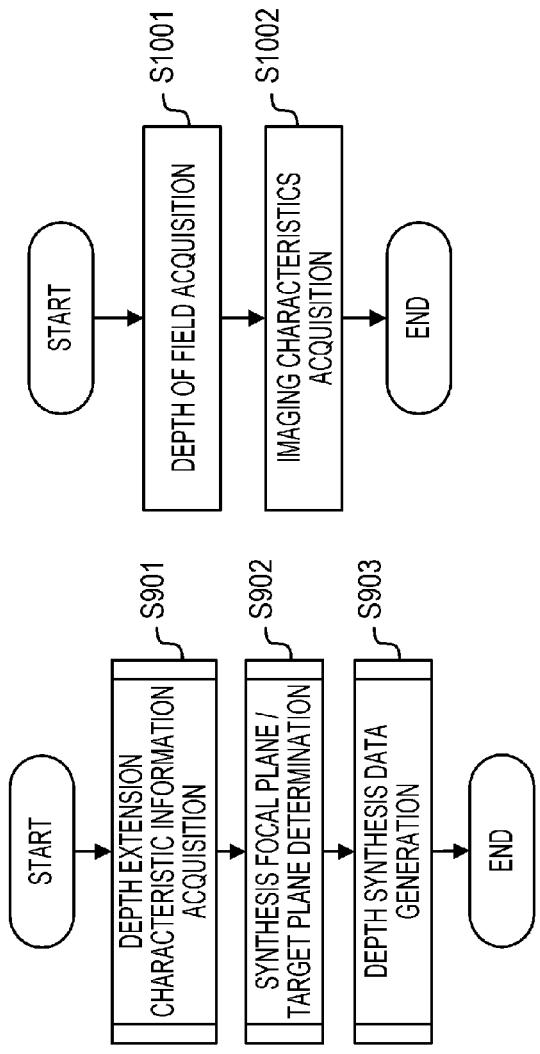
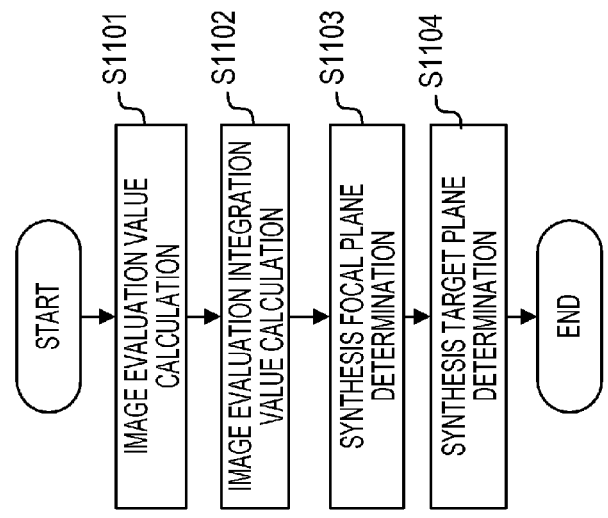

Z STACK IMAGE

IMAGE EVALUATION VALUE
AT EACH POSITION

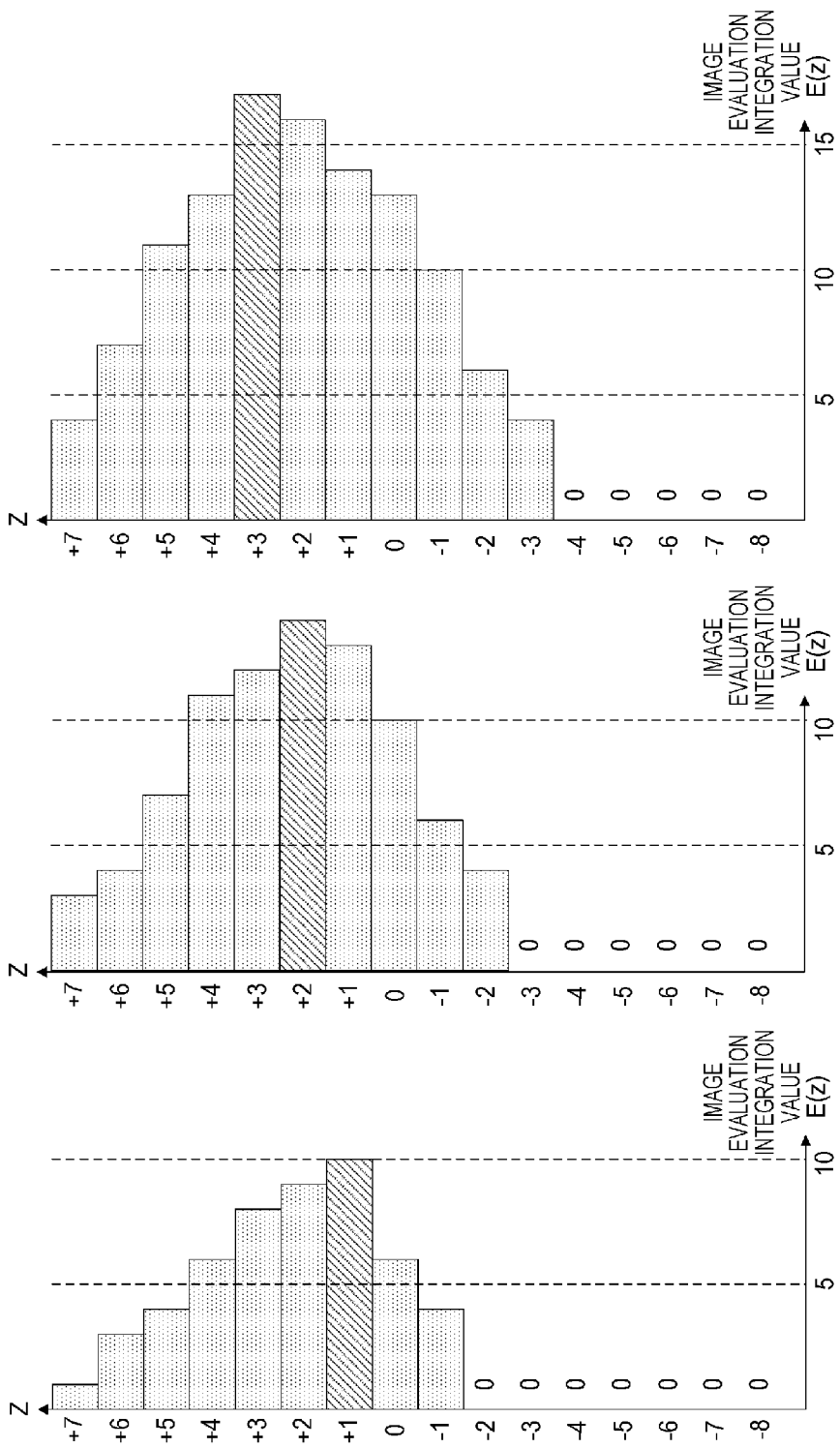

3D PSF

2D PSF

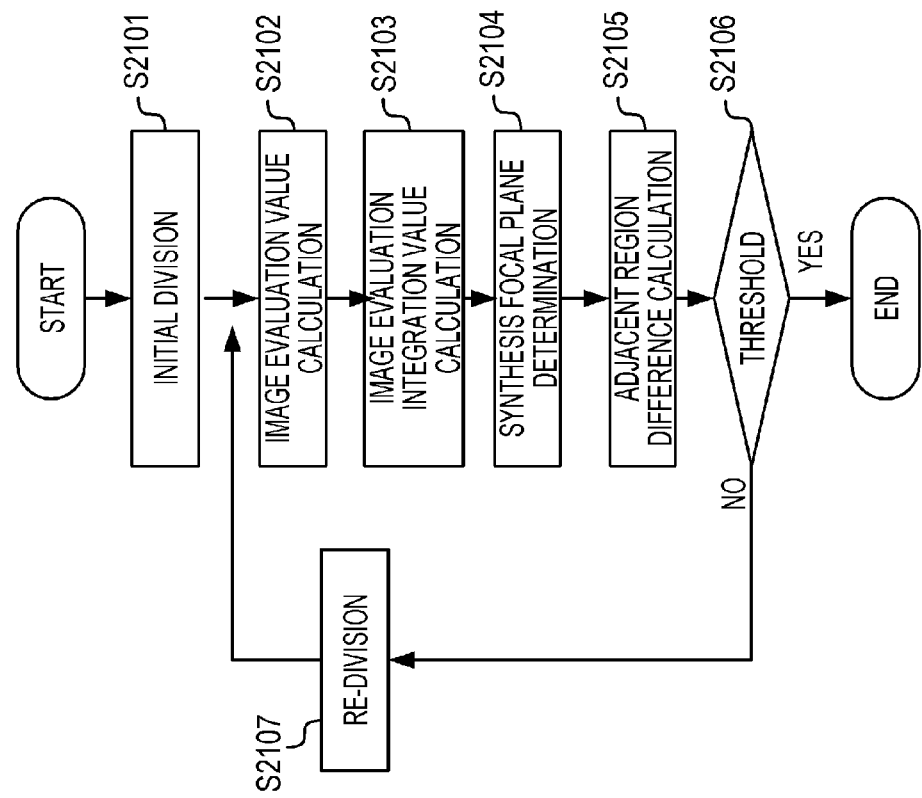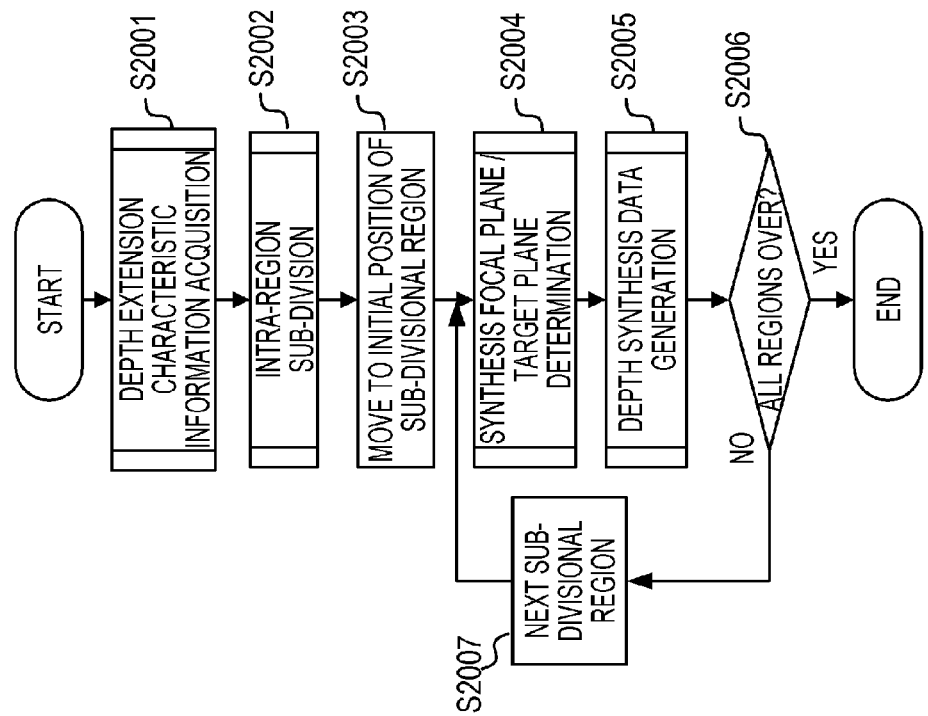

INITIAL DIVISION

RE-DIVISION

MODIFICATION ONLY OF DEPTH OF FIELD

MODIFICATION OF DEPTH OF FIELD AND IMAGE SIZE

IMAGE PROCESSING APPARATUS AND IMAGE PROCESSING METHOD

TECHNICAL FIELD

The present invention relates to a technology that generates, from a plurality of image data items obtained by imaging a subject while varying a focal position in the optical axis direction, image data having a deeper depth of field than the plurality of image data items.

BACKGROUND ART

In the field of pathology, as an alternative to optical microscopes which are one of the tools of pathological diagnosis, virtual slide systems enable pathological diagnosis on a display through imaging and digitization of a sample that is placed on a slide. Digitization of a pathological diagnostic image using the virtual slide system makes it possible to handle, in the form of digital data, conventional optical microscopic images of samples. This is advantageous in terms of, for instance, faster remote diagnosis, briefing to patients using digital images, sharing of rare cases, and greater education and training efficiency.

In order to realize, through virtualization, the operation of an optical microscope in a virtual slide system, the entire image of a sample placed on a slide must be digitized. Through digitization of the entire image of the sample, the digital data generated by the virtual slide system can be observed using viewer software running on a PC or workstation. Upon digitization of the entire image of the sample, the number of resulting pixels is enormous, ordinarily of several hundreds of millions to several billions, which translates into a huge volume of data.

Although the volume of data generated by the virtual slide system is enormous, images can be observed microscopically (detailed enlarged image) and macroscopically (whole overhead image), through enlargement or reduction in the viewer. This affords various benefits. Low-magnification images to high-magnification images can be instantaneously displayed, at the resolution and magnifications required by the user, through preliminary acquisition of all the necessary information items.

However, ruggedness in a cover glass, a slide glass and a specimen gives rise to waviness in the slide. Even in there is no such ruggedness, the specimen has a thickness of its own, and the depth position of tissue or cells to be observed depends on the observation position (in the horizontal direction) of the slide. Accordingly, configurations exist wherein a plurality of images is captured by varying the focal position along the optical axis direction, with respect to one slide (object). In such a configuration, acquired image data of the plurality of images acquired by virtue of such a configuration is referred to as a "Z stack image", and plane images, at respective focal positions, that make up the Z stack image, are referred to as "layer images".

In the virtual slide system, the specimen is ordinarily shot at each local region of the specimen at a high magnification (high NA), from the viewpoint of efficiency, and the shot images are spliced to generate thereby a complete image. The complete image has high spatial resolution, but shallow depth of field. In the virtual slide system, accordingly, the depth of field of a low-magnification image (for instance, objective lens 10×) resulting from reducing a high-magnification image (for instance, objective lens 40×), is shallower than the depth of field of an image directly observed in the optical microscope, and contains defocusing that was not present in the original low-magnification image. In pathological diagnosis, total screening must be performed in order to avoid overlooking lesion sites in low-magnification images. Therefore, the pathologist lays emphasis on the image quality of low-magnification images, and low-magnification images must be generated that exhibit little quality deterioration on account of defocusing.

The below-described conventional approaches have been proposed as regards enhancing image quality in low-magnification images in virtual slide systems. PTL1 discloses a configuration wherein layer images selected from among a Z stack image are displayed upon display of a high-magnification image; upon display of a low-magnification image, by contrast, an image totally in focus (all-in-focus image) is synthesized and displayed by using all the layer images that make up a Z stack image.

A below-described conventional technology relating to control of depth of field has been proposed. PTL2 discloses a configuration wherein coordinate conversion processing is performed on a plurality of shot images with varying focal position, in such a manner that the shot images match a three-dimensional convolution model, and the depth of field is extended as a result of three-dimensional filtering processing that involves modifying blurring on a three-dimensional frequency space.

CITATION LIST

Patent Literature

[PTL1] Japanese Patent Application Publication No. 2005-037902
[PTL2] Japanese Patent Application Publication No. 2007-128009

SUMMARY OF INVENTION

Technical Problem

However, the above-described conventional techniques have the problems below.

The method in PTL1 allows selecting only two kinds of images, namely images of shallow depth of field, or all-in-focus images. The depth of field (or image blurring) in both these kinds of images is significantly dissimilar from the visually observed image in an optical microscope. The pathologist grasps the three-dimensional structure of tissue and cells on the basis of the blurring information contained in the image. Magnification-dependent blurring is a valuable information item for diagnosis. The method of PTL1, however, enabled generation only of either high-magnification images having a shallow depth of field or all-in-focus low-magnification images. This was problematic in that, as a result, three-dimensional structures were difficult to estimate on the basis of blurring information for intermediate magnifications (for instance, objective lens 20×).

The method in PTL2 allows generating images of any depth of field from a Z stack image. However, PTL2 discloses only a method that uses all the layer images in the Z stack image. Using all the layer images in depth-of-field extension processing is problematic on account of the greater computational cost and slower response speed incurred thereby. In particular, a serious problem arises in that the number of layer images grows as the resolution and size of the layer images increase.

Solution to Problem

In the light of the above problems, it is an object of the present invention to curb computational cost in depth-of-field extension processing according to user settings, in a virtual slide system, and to increase device throughput (processed images per unit time) and/or response speed.

The present invention in its first aspect provides an image processing apparatus that generates, from a plurality of first image data items obtained by imaging a subject while varying a focal position in an optical axis direction, second image data having a deeper depth of field than the first image data items, the image processing apparatus comprising: an imaging characteristic acquisition unit that acquires, on the basis of information that designates a depth of field for second image data to be generated, imaging characteristics of a virtual optical system having the designated depth of field; a selection unit that determines, on the basis of the imaging characteristics acquired by the imaging characteristic acquisition unit, an influence range in which an influence exerted onto an image by an object that is spaced apart from the focal position in the optical axis direction is greater than a predetermined condition, and that selects first image data of which focal position is contained within the influence range, from among the plurality of first image data items; and a generation unit that generates the second image data using the first image data selected by the selection unit.

The present invention in its first aspect provides an image processing apparatus that generates, from a plurality of first image data items obtained by imaging a subject while varying a focal position in an optical axis direction, second image data having a deeper depth of field than the first image data items, the image processing apparatus comprising: an imaging characteristic acquisition unit that acquires, on the basis of information that designates a depth of field for second image data to be generated, imaging characteristics of a virtual optical system having the designated depth of field; a determination unit that determines a synthesis focal plane corresponding to the focal position of the second image data to be generated, on the basis of the designated depth of field; and a generation unit that generates the second image data on the basis of the imaging characteristics acquired by the imaging characteristic acquisition unit and the synthesis focal plane determined by the determination unit.

The present invention in its first aspect provides an image processing method of generating, from a plurality of first image data items obtained by imaging a subject while varying a focal position in an optical axis direction, second image data having a deeper depth of field than the first image data items, the image processing method comprising: an imaging characteristic acquisition step in which, on the basis of information that designates a depth of field for second image data to be generated, a computer acquires imaging characteristics of a virtual optical system having the designated depth of field; a selection step in which, on the basis of the imaging characteristics acquired in the imaging characteristic acquisition step, the computer determines an influence range in which an influence exerted onto an image by an object that is spaced apart from the focal position in the optical axis direction is greater than a predetermined condition, and selects first image data of which focal position is contained within the influence range, from among the plurality of first image data items; and a generation step in which the computer generates the second image data using the first image data selected in the selection step.

The present invention in its first aspect provides an image processing method of generating, from a plurality of first image data items obtained by imaging a subject while varying a focal position in an optical axis direction, second image data having a deeper depth of field than the first image data items, the image processing method comprising: an imaging characteristic acquisition step in which, on the basis of information that designates a depth of field for second image data to be generated, a computer acquires imaging characteristics of a virtual optical system having the designated depth of field; a determination step in which the computer determines a synthesis focal plane corresponding to the focal position of the second image data to be generated, on the basis of the designated depth of field; and a generation step in which the computer generates the second image data on the basis of the imaging characteristics acquired in the imaging characteristic acquisition step and the synthesis focal plane determined in the determination step.

The present invention in its first aspect provides a program for causing a computer to execute each step of the image processing method according to the present invention.

The present invention succeeds in reducing computational cost and enhancing the throughput and response speed of a device in depth-of-field extension processing according to user settings in a virtual slide system.

Further features of the present invention will become apparent from the following description of exemplary embodiments with reference to the attached drawings.

BRIEF DESCRIPTION OF DRAWINGS

FIG. 1 is a configuration diagram of a virtual slide system in Embodiment 1;

FIGS. 5A to 5D are diagrams for explaining an imaging region in a main measurement and a preliminary measurement in Embodiment 1;

FIGS. 9A to 9C are flowcharts of depth extension processing S404 in Embodiment 1;

FIGS. 11A to 11C are diagrams for explaining image evaluation integration value calculation processing S1102 in Embodiment 1;

FIGS. 16A and 16B are flowcharts of depth extension processing S404 in Embodiment 2;

DESCRIPTION OF EMBODIMENTS

[Embodiment 1]

Overall System Configuration

Figure 2A:
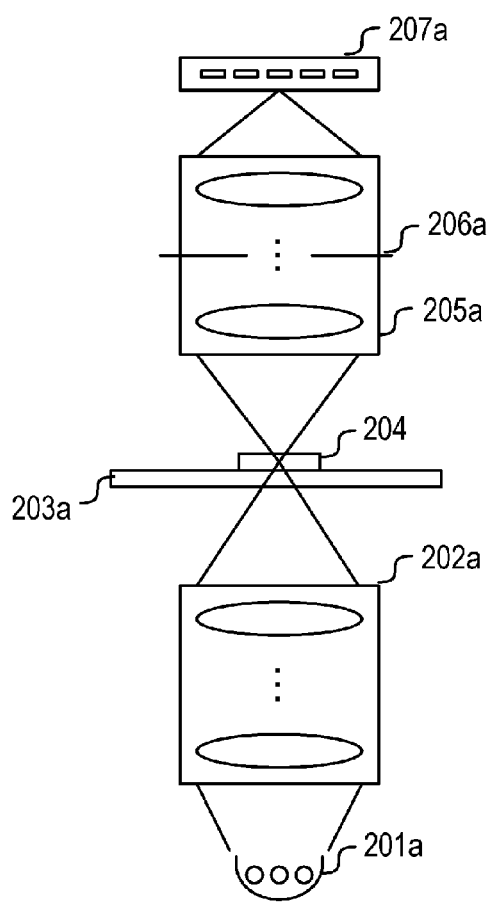
FIGS. 2A and 2B are configuration diagrams of a main measurement unit and a preliminary measurement unit in Embodiment 1.
Figure 2B:
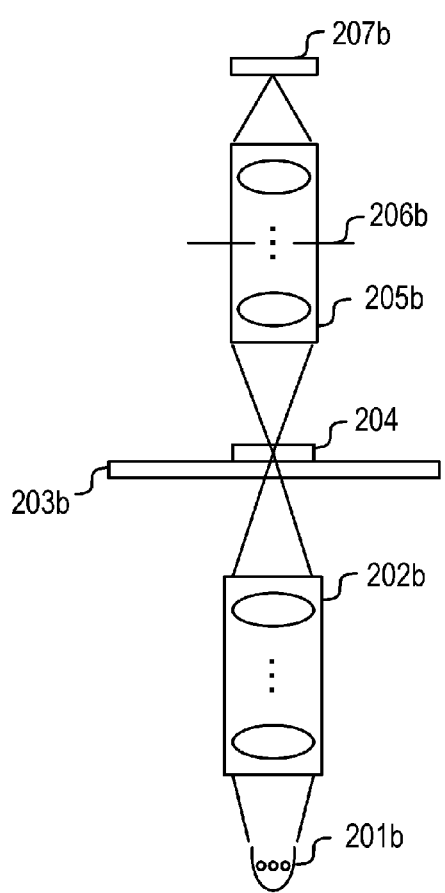

FIG. 1 illustrates the configuration of a virtual slide system that is one embodiment of the imaging system of the present invention.

The virtual slide system is made up of an imaging apparatus (also called a virtual slide scanner) 120 that acquires image data of a subject, an image processing apparatus (also called a host computer) 110 that performs data processing and control, and peripherals of the image processing apparatus 110.

The image processing apparatus 110 is connected to an operation input device 111, such as a keyboard, a mouse or the like, that receives inputs from a user, and a display 112 that displays processed images. A storage device 113 and another computer system 114 are connected to the image processing apparatus 110.

In a case where a plurality of subjects (slides) are batch-processed, the imaging apparatus 120 captures respective subjects, under the control of the image processing apparatus 110, and the image processing apparatus 110 processes the image data of the subjects as required. The obtained image data of the subjects is transmitted to, and stored in, the storage device 113, which is a large-capacity data storage unit, or the other computer system 114.

To realize imaging (preliminary measurement and main measurement) in the imaging apparatus 120, the image processing apparatus 110, upon reception of user input, issues an instruction to a controller 108. The controller 108 controls next the main measurement unit 101 and the preliminary measurement unit 102.

The main measurement unit 101 is an imaging unit that acquires high-definition images for object diagnosis in the slides. The preliminary measurement unit 102 is an imaging unit that performs imaging prior to the main measurement, and acquires images for the purpose of imaging control information acquisition, for acquiring images of good precision in the main measurement.

A displacement meter 103 is connected to the controller 108, and is configured so as to enable measuring the position and distance of a slide that is disposed on a stage in the main measurement unit 101 or the preliminary measurement unit 102. The displacement meter 103 is used in order to measure the thickness of a subject in the slide, in the main measurement and preliminary measurement.

An aperture stop control 104, a stage control 105, an illumination control 106 and a sensor control 107, for controlling the imaging conditions of the main measurement unit 101 and the preliminary measurement unit 102, are connected to the controller 108. The foregoing are configured to control the operation of the aperture stop, stage, illumination and image sensors according to respective control signals from the controller 108.

On the stage there are provided an XY stage that moves the slide in a direction perpendicular to the optical axis, and a Z stage that moves the slide in a direction along the optical axis. The XY stage is used for capturing images wherein the plane position of a subject is changed in a direction perpendicular to the optical axis, and the Z stage for capturing images wherein the focal position is changed in the depth direction. Although not shown in the figures, the imaging apparatus 120 is provided with a rack in which a plurality of slides can be set, and a transport mechanism that conveys slides from the rack to an imaging position on the stage. In the case of batch processing, the controller 108 controls the transport mechanism that causes slides to be sequentially conveyed, one by one, from the rack onto the stage of the preliminary measurement unit 102, and the stage of the main measurement unit 101.

An AF unit 109 for realizing autofocus using the captured images is connected to the main measurement unit 101 and the preliminary measurement unit 102. Via the controller 108, the AF unit 109 can find the focusing position through control of the position of the stage in the main measurement unit 101 and the preliminary measurement unit 102. The autofocus scheme is of passive type relying on images. A known phase-difference detection scheme or contrast detection scheme is used herein.

(Main Measurement Unit)

FIG. 2A is diagram illustrating the internal configuration of the main measurement unit 101 in Embodiment 1.

Light from the light source 201a passes through an illumination optical system 202a, is uniformized so as to be free of light intensity unevenness, and is irradiated onto a slide 204 that is disposed on a stage 203a. To prepare the slide 204, smeared cells or a tissue section to be observed are affixed to a slide glass and are fixed, together with an encapsulant, to an overlaying cover glass, in a state that enables observation of the subject.

An imaging optical system 205a is a system for leading an image of the subject to an imaging device 207a that is an imaging means. Light that traverses the slide 204 passes through the imaging optical system 205a, to form an image on an imaging plane on the imaging device 207a. An aperture stop 206a is present in the imaging optical system 205a, such that depth of field can be controlled through adjustment of the aperture stop 206a.

During imaging, the light source 201a is lit-up, and light is irradiated onto the slide 204. Light of the image formed on the imaging plane after having passed through the illumination optical system 202a, the slide 204 and the imaging optical system 205a, is received by an image sensor of the imaging device 207a. During monochrome (gray scale) shooting, the light source 201a is exposed in white, to perform one image capture. During color shooting, a color image is acquired through three sequential RGB exposures of the light source 201a, and three image captures, to acquire thereby a color image.

The image of the subject formed on the imaging plane undergoes photoelectric conversion in the imaging device 207a that is configured out of a plurality of image sensors, is subjected to A/D conversion, and the image is sent thereafter, in the form of an electric signal, to the image processing apparatus 110. In the present embodiment, development processing, typified by noise removal, color conversion processing and sharpening processing, after A/D conversion, are explained as being performed in the image processing apparatus 110. However, the development processing may be performed in a dedicated image processing unit (not shown) that is connected to the imaging device 207a, such that, after processing, data is transmitted to the image processing apparatus 110. Such an embodiment lies also within the scope of the present invention.

(Preliminary Measurement Unit)

FIG. 2A is diagram illustrating the internal configuration of the preliminary measurement unit 102 of Embodiment 1.

Light from a light source 201b passes through an illumination optical system 202b, is uniformized so as to be free of light intensity unevenness, and is irradiated onto the slide 204 that is disposed on a stage 203b. An imaging optical system 205b causes light that traverses the slide 204 to form an image on an imaging plane on an imaging device 207b. An aperture stop 206b is present in the imaging optical system 205b, such that depth of field can be controlled through adjustment of the aperture stop 206b.

During imaging, the light source 201b is lit-up, and light is irradiated onto the slide 204. Light of the image formed on the imaging plane after having passed through the illumination optical system 202b, the slide 204 and the imaging optical system 205b, is received by an image sensor of the imaging device 207b. During monochrome (gray scale) shooting, the light source 201b is exposed in white, to perform one image capture. During color shooting, a color image is acquired through three sequential RGB exposures of the light source 201b, and three image captures, to acquire thereby a color image.

The image of the subject formed on the imaging plane undergoes photoelectric conversion in the imaging device 207b that is provided with an image sensor, and is subjected to A/D conversion. The image is sent thereafter, in the form of an electric signal, to the image processing apparatus 110. In the present embodiment, development processing, typified by noise removal, color conversion processing and sharpening processing, after execution of A/D conversion, are explained as being performed in the image processing apparatus 110. However, the development processing may be performed in a dedicated image processing unit (not shown) that is connected to the imaging device 207b, such that, thereafter, data is transmitted to the image processing apparatus 110. Such an embodiment lies also within the scope of the present invention.

(Image Processing Apparatus)

Figure 3:
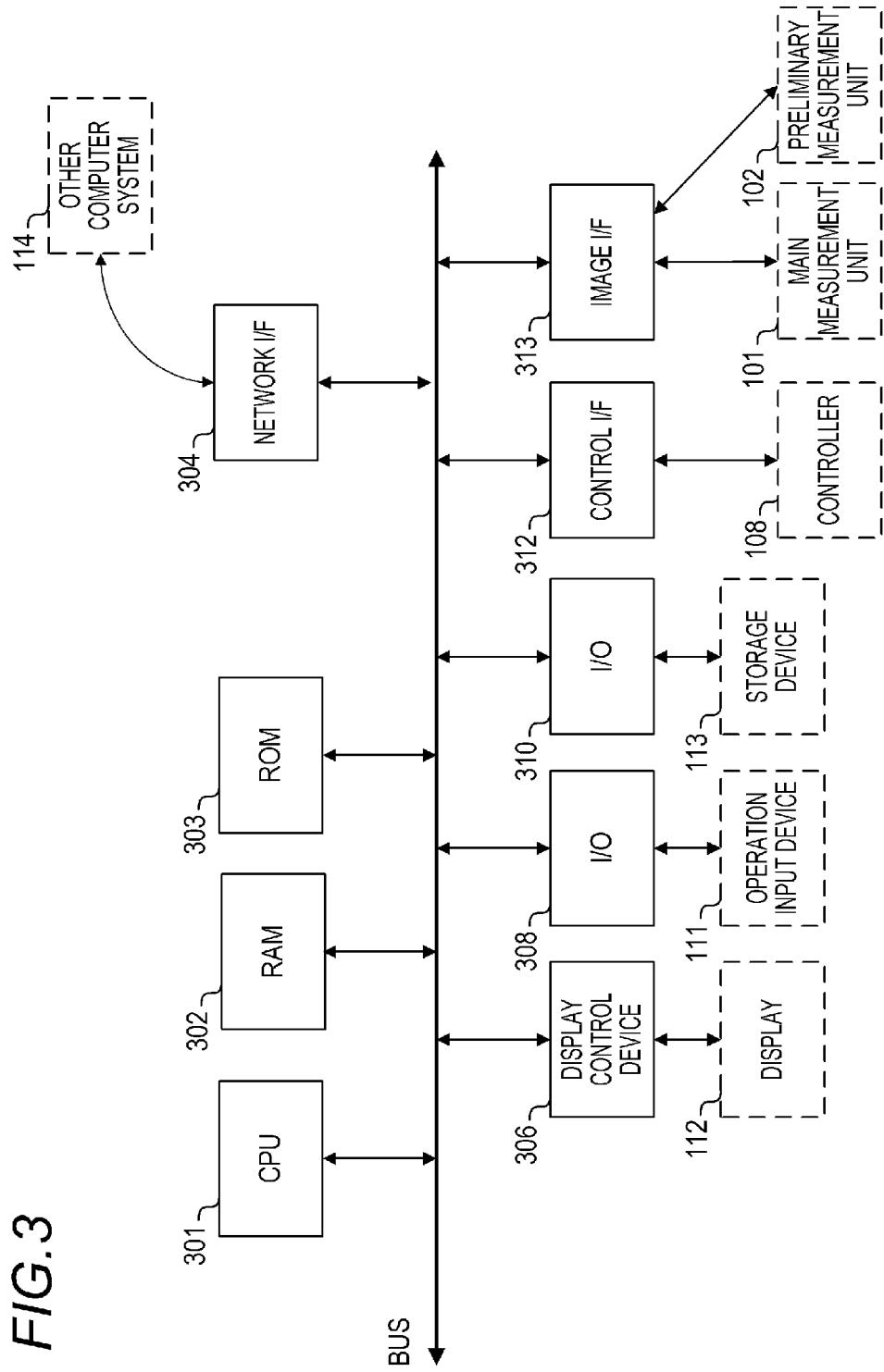
FIG. 3 is an internal configuration diagram of an image processing apparatus in Embodiment 1.

FIG. 3 is a diagram illustrating the internal configuration of the image processing apparatus (host computer) 110 of the present invention.

A CPU 301 controls the entirety of the image processing apparatus by using programs and data that are stored in the RAM 302 and the ROM 303. The CPU 301 performs, for instance, computation processing, data processing, for instance the below-described depth-of-field extension processing, development and correction processing, synthesis processing and compression processing, that are performed in the embodiments explained below.

The RAM 302 is provided with an area in which there are temporarily stored programs and data that are loaded from the storage device 113, as well as programs and data downloaded, via a network I/F (interface) 304, from the other computer system 114. The RAM 302 is provided with a working area that the CPU 301 requires for carrying out the various processing items. The ROM 303 stores functional programs of the computer as well as setting data. The display control device 306 performs control processing for displaying images, text and the like, on the display 112. The display 112 performs screen display for prompting inputs from the user, and displays images of the image data that is acquired from the imaging apparatus 120 and that is processed in the CPU 301.

The operation input device 111 is made up of devices, for instance a keyboard and a mouse, for input of various instructions to the CPU 301. By way of the operation input device 111, the user inputs information for controlling the operation of the imaging apparatus 120. The reference numeral 308 denotes an I/O for notifying, to the CPU 301, for instance various instructions that are inputted via the operation input device 111.

The storage device 113 is a large-capacity information storage device, for instance a hard disk or the like, and stores, for instance, an OS (operating system), programs for causing the CPU 301 to execute the processes of the embodiment as explained hereafter, as well as scanned image data by batch processing.

Writing of information to the storage device 113 and reading of information from the storage device 113 are performed via an I/O 310. A control I/F 312 is an I/F for exchange of control commands (signals) with the controller 108 for controlling the imaging apparatus 120.

The controller 108 has the function of controlling the main measurement unit 101 and the preliminary measurement unit 102. Other than the above-described interface, for instance an external interface for acquisition of output data of a CMOS image sensor or a CCD image sensor is connected also to the image I/F (interface) 313. A serial interface such as USB, IEEE 1394 or the like, or a Camera Link or the like, can be used as the interface. The main measurement unit 101 and the preliminary measurement unit 102 are connected via the image I/F 313.

(Depth Extension Processing Flow)

Figure 4:
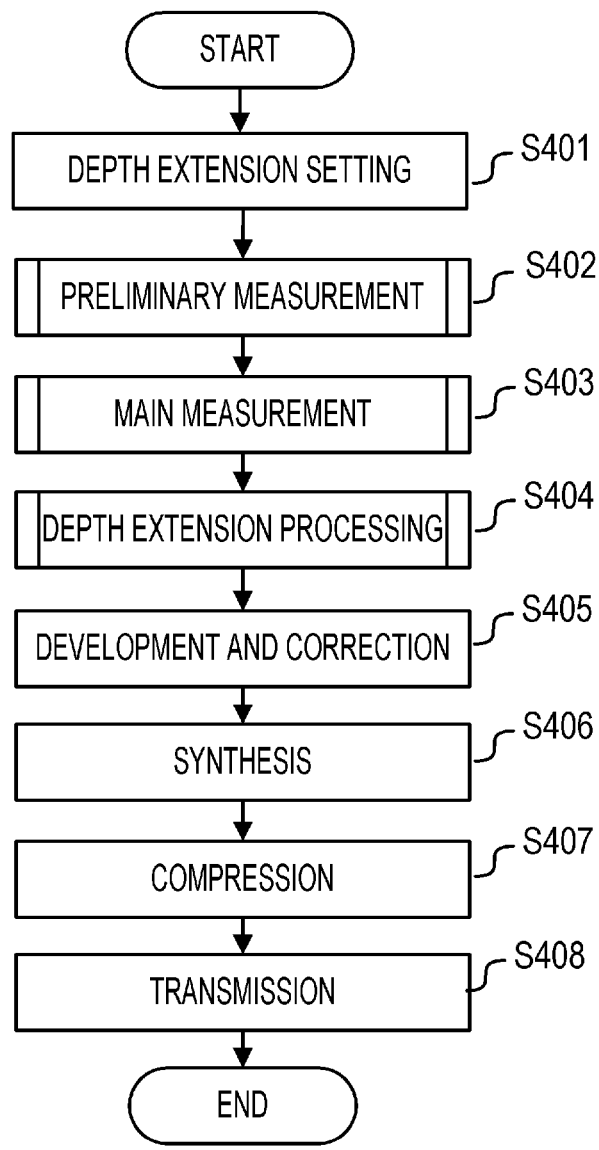
FIG. 4 is a flowchart of depth extension processing in Embodiment 1.

The virtual slide system of the present invention executes the depth extension processing flow illustrated in FIG. 4, and generates depth-extended image data having a depth of field designated by the user. Depth extension processing is explained below with reference to FIG. 4.

Firstly, in depth extension setting S401 there is set, as depth extension original information, a extension amount (i.e. information that designates the depth of field of depth-extended image data) of the depth of field desired by the user, through the operation input device 111, for the image processing apparatus 110. Various settings can be assigned to the depth extension original information. Examples thereof include, for instance objective lens magnification and/or aperture stop. Other examples include, for instance, the model number of the objective lens in an existent optical microscope, the type of virtual objective lens, the NA (numerical aperture) after depth-of-field extension and the like. In a case where the NA is set, the NA must be smaller than the NA of the imaging optical system 205a. Needless to say, the depth of field on its own can also be designated.

In the depth extension setting S401 there is displayed a setting screen on the display 112 that is connected to the image processing apparatus 110, by way of an application that controls the imaging apparatus 120 on the image processing apparatus 110. The user sets the above-described depth extension original information. In a case where, for instance, objective lens magnification is to be set, the depth of field is presented to the user in a sensory manner, by adopting a configuration where the user is prompted to select a magnification, for instance, 40×, 20×, 10× and so forth that is often used in optical microscopes. The rate of change of the NA may be set in a case where the aperture stop is set.

Next, in preliminary measurement processing S402, there is determined XY divisional imaging position information and Z stack imaging position information necessary for data acquisition in the subsequent main measurement processing S403. Herein, the XY divisional imaging position information is information necessary for divisional imaging in which a specimen is divisionally imaged, a plurality of times, in a plane (XY plane) that is perpendicular to the optical axis (Z-axis), and denotes specifically the position and the amount of movement of the XY stage that are necessary for causing the center of each divisional imaging region to be superimposed on the imaging optical system 205a. The Z stack imaging position information denotes information that is necessary for motion of the Z stage upon acquisition of Z stack image data through movement along the optical axis (Z-axis), for each divisional imaging region. The Z stack imaging position may be dissimilar for each divisional imaging region.

Next, in main measurement processing S403, the controller 108 is controlled using the information determined in the preliminary measurement processing S402, and Z stack image data is acquired for each divisional imaging region, and is sent to the image processing apparatus 110.

Next, in depth extension processing S404, there is generated image data having extended depth of field, using Z stack image data, for each divisional imaging region, as shot in the main measurement processing S403, as well as the depth extension original information (depth-of-field extension amount) that is set in the depth extension setting S401.

The preliminary measurement processing S402, main measurement processing S403 and depth extension processing S404 are explained in detail further on.

Next, in development and correction processing S405, the image processing apparatus 110 performs color conversion processing, sharpening processing, noise reduction processing and the like, on the abovementioned image data having undergone depth-of-field extension. As a result of these processing items, the color in the image that is displayed on the display 112 is brought closer to the actual color of the specimen, sharpening processing is performed in a preferred manner for observation, and image noise is suppressed.

Next, in synthesis processing S406, the image processing apparatus 110 splices the image data having undergone depth extension processing and development and correction processing, for each divisional imaging region, to create an image of the entirety (for instance, a 20 mm square region) of the observation target region, on the slide.

Next, in compression processing S407, the image processing apparatus 110 compresses the image data having undergone synthesis processing, to reduce data volume. A still-image compression and encoding scheme such as JPEG or JPEG2000 can be used as the compression method.

Next, in transmission processing S408, the image processing apparatus 110 sends image data having undergone compression processing to the storage device 113, where the data is saved. The image processing apparatus 110 may transmit the image data to the computer system 114 on a network, or to an image server, by way of the network I/F.

(Operation of the Device in Preliminary Measurement and Main Measurement)

The operation of the device in the preliminary measurement processing S402 and the main measurement processing S403 is explained next with reference to FIG. 5A to FIG. 5D, FIG. 6A and FIG. 6B.

FIG. 5A is a schematic diagram of a slide. A slide glass 510 has thereon a label area 512 and a region where a subject 500 is sealed by a cover glass 511. The target for imaging in the main measurement processing S403 is the interior of a bounding rectangle region at which the subject 500, having been detected in the preliminary measurement, is present.

FIG. 5B illustrates the way in which imaging is performed by dividing the bounding rectangle region, at which the subject 500 is present, into a plurality of regions, in the main measurement processing S403. FIG. 5C illustrates an imaging plane, wherein an effective field of view 502 denotes an area onto which an image is projected after having passed through to the imaging optical system 205a of the main measurement unit 101, and a sensor effective region 503 denotes a region that can be captured by the image sensor of the imaging device 207a. An imaging region 501 (hatched region) at the object plane corresponds to an imaging region 504 in an imaging plane at which an image is formed through the imaging optical system 205a of the main measurement unit 101.

As illustrated in FIG. 5C, a somewhat wider region than the imaging region 504 is assigned to the sensor effective region 503. This constitutes a margin for the purpose of allowing for the optical aberration of the imaging optical system 205a, and for misalignment of the mounting position of the image sensor. Specifically, the imaging region 501 in the object plane can be accommodated within the sensor effective region 503 even in case of optical aberration and misalignment in the mounting position of the sensor. In the synthesis processing S406 there is performed position misalignment correction and aberration correction on the image of the sensor effective region 503, portions corresponding to the imaging region 504 are excised from the corrected image, and the resulting image is used for synthesis.

FIG. 5D illustrates an imaging region 505 of the slide 204 in preliminary measurement. The purpose of preliminary measurement is to acquire imaging control information for imaging with good precision in the main measurement. Herein, it suffices that image characteristics be grasped roughly, and no definition (magnification) such as that of the main measurement is required. In the preliminary measurement of the present embodiment, the entirety of the slide 204 is imaged at low magnifications. Unlike in the main measurement, the entirety of the slide 204 is batch-imaged by one image sensor, without division into a plurality of regions. As a result, the configuration of the preliminary measurement unit 102 can be simplified, and there can be shortened the time required for preliminary measurement, and accordingly, the time for the whole imaging processing, including the preliminary measurement and the main measurement.

Figure 6A:
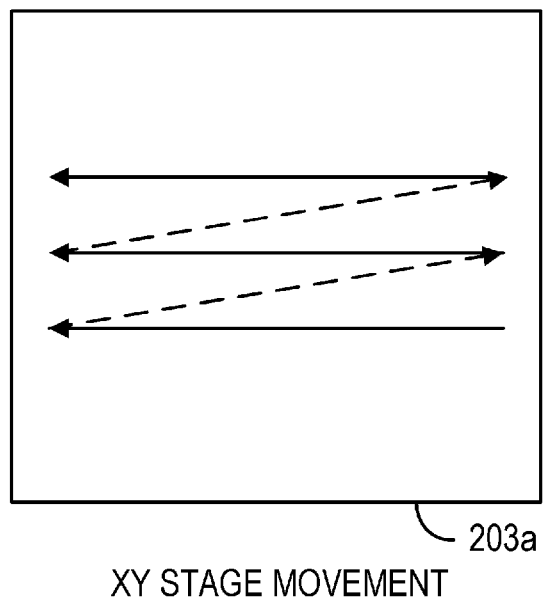
FIGS. 6A and 6B are diagrams for explaining the movement direction of an XY stage and a Z stage in Embodiment 1.

FIG. 6A illustrates the movement directions and movement sequence in the XY direction, of the stage 203a, in a case where the divisional imaging region illustrated in FIG. 5B is imaged in a raster scan order. To capture a region from the upper left to a lower right region of the slide, the stage 203a on which the slide is placed is caused to move in the reverse direction, from the lower right towards the upper left. The imaging region is divided into a plurality of regions. Imaging is performed repeatedly while the stage 203a is caused to move; as a result, a wide region can be imaged with a comparatively small image sensor.

Figure 6B:
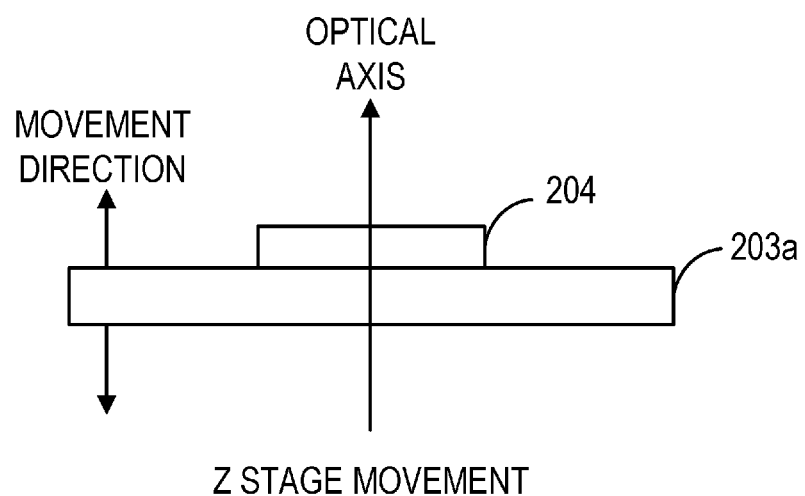

FIG. 6B illustrates the movement direction in the Z direction (depth direction) of the stage 203a, in a case where a plurality of images is acquired that have dissimilar focal positions (also referred to as observation depths, or focus positions), in the main measurement processing S403. As illustrated in the figure, in order to shift the focal position to the top of the subject in the slide 204 (to the rear side of the cover glass), the stage 203a is caused to move downward in the Z direction, along the optical axis direction of the imaging optical system 205a. Conversely, in order to shift the focal position to the bottom of the subject (to the front face of slide glass), the stage 203a is caused to move upward in the Z direction.

The focal position can be changed by causing both the stage 203a and the imaging device 207a, or the imaging device 207a, to move along the optical axis direction of the imaging optical system 205a. The focal position can be changed also by optically changing the focal distance, through control of the lens of the imaging optical system 205a. The stage mechanism in the preliminary measurement unit 102 is substantially identical to that of the main measurement unit 101, and hence an explanation thereof will be omitted.

(Preliminary Measurement Processing S402)

Figure 7:
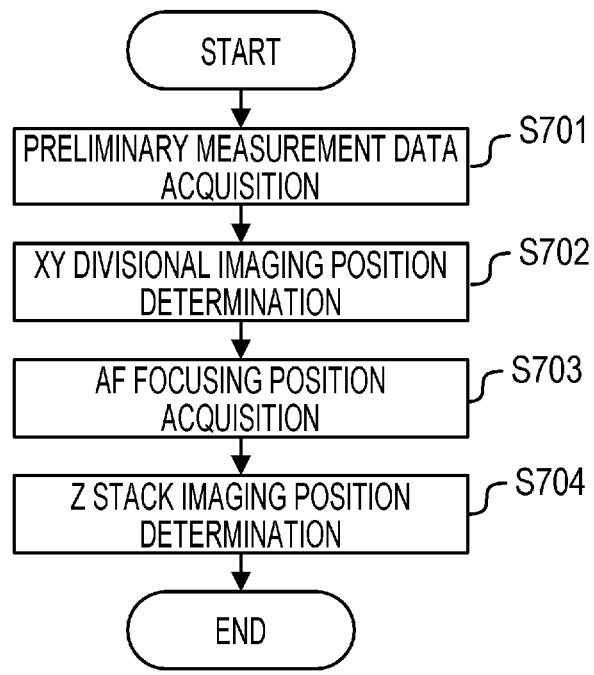
FIG. 7 is a flowchart of preliminary measurement processing S402 in Embodiment 1.

The internal processing flow in the preliminary measurement processing S402 will be explained next with reference to FIG. 7.

In the preliminary measurement processing, firstly, an image of the specimen (called preliminary measurement data) is acquired in preliminary measurement data acquisition S701. The operation of the device during acquisition has already been explained, and will not be explained again.

Next, in XY divisional imaging position determination processing S702, there is determined an imaging region of the specimen in the XY direction, and XY divisional imaging position information is calculated. Specifically, the subject 500 is detected from an image of the preliminary measurement data, a bounding rectangle of the subject 500 is calculated, and an imaging range of the specimen is determined. In a case where the rectangular area cannot be captured in one-time imaging by the main measurement unit 101, then the divisional imaging region 501 for main measurement is determined through division of the rectangular area as illustrated in FIG. 5B. Information required for XY stage movement during shooting for each divisional imaging region that has been obtained, i.e. XY divisional imaging position information, is calculated thereafter.

The bounding rectangle can be calculated in accordance with known techniques such as image brightness analysis or the like, and hence a detailed explanation thereof will be omitted. In a case where the user designates the imaging region, the divisional imaging region is determined and the XY divisional imaging position information is calculated for that region.

Next, in an AF focusing position acquisition processing S703, autofocus is performed for each divisional imaging region, using the AF unit 109, and an in-focus Z position (referred to as AF focusing position) is acquired.

Next, in Z stack imaging position determination processing S704, the Z stack imaging position is determined, for each divisional imaging region, using the main measurement unit 101. In this processing, the stage 203a is caused to move back and forth, from the AF focusing position, along the optical axis direction, for each divisional imaging region, there is calculated a range, in the Z direction, having sharpness (contrast) equal to or higher than a given value within the image, and that range is determined to be a Z stack imaging region. In S704, the preliminary measurement unit 102 may be used instead of the main measurement unit 101; alternatively, a front face and a rear face position of the subject, in the slide, may be examined using the displacement meter 103, and the interval therebetween may be established as the Z stack imaging region.

This is followed by movement over a predetermined Z stack spacing, centered on the AF focusing position, to determine thereby the number of layer images and information necessary for movement of the Z stage, i.e. Z stack imaging position information, during shooting, in such a manner that the obtained Z stack imaging region can be covered. The Z stack spacing is preferably the depth of field of the imaging optical system 205a, but there can also be used a value set beforehand by the user.

For instance, the Z stack imaging region is a ±5 μm region centered on the AF focusing position, and the depth of field of the imaging optical system 205a is set to 0.5 μm. In this case, there are 21 layer images that make up the Z stack image, and the Z stack imaging position information is AF focusing position ±0.5n [μm] (n=0 to 10). In the determination of the Z stack imaging position information for each divisional imaging region, the position, in the Z direction, of objects (cell or tissue) that constitutes the observation target exhibits variability on account of, for instance, irregularities in the specimen and waviness in the cover glass.

The positions in the XY divisional imaging position information and Z stack imaging position information are sorted in ascending or descending order, in such a manner that the amount of movement of the stage 203a during shooting in the image processing apparatus 110 may be small, and the sorted information is then stored in the RAM 302 in the image processing apparatus 110 or in the storage device 113.

(Main Measurement Processing S403)

Figure 8:
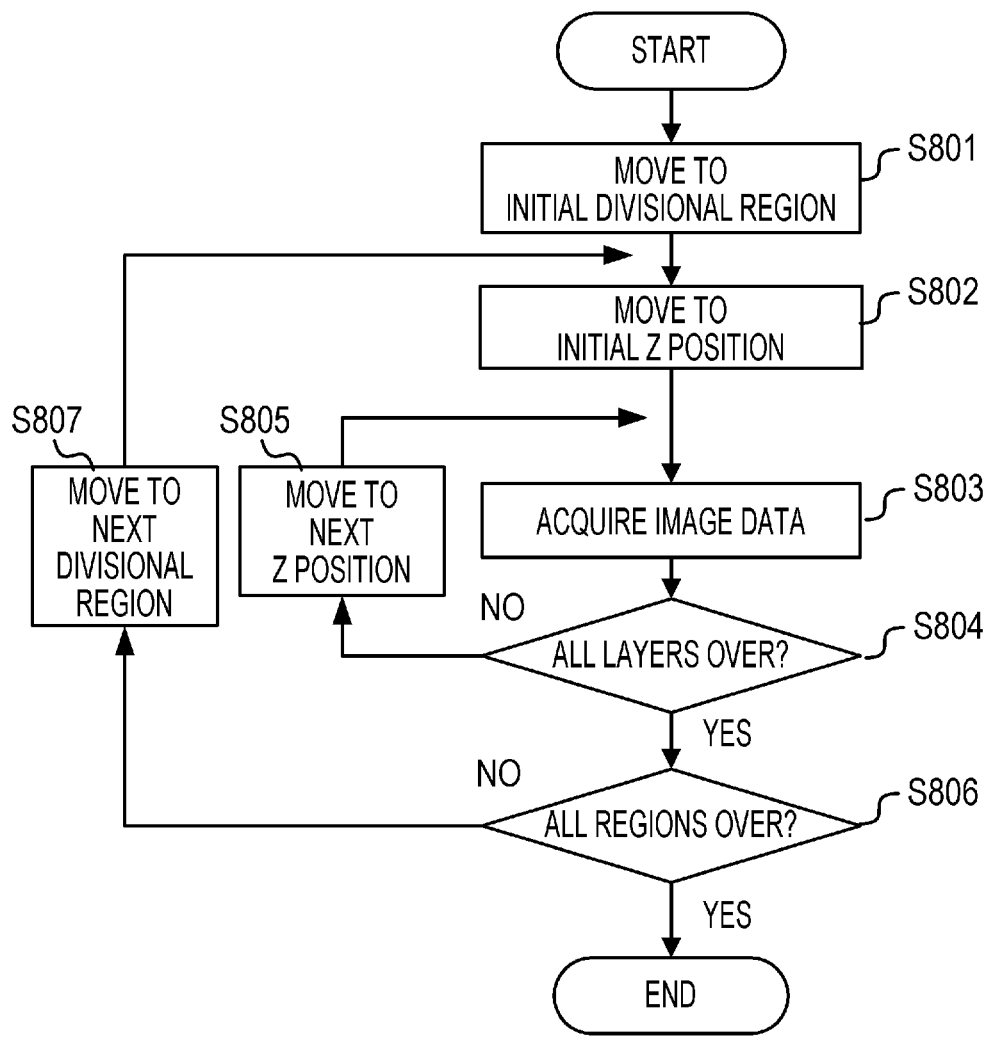
FIG. 8 is flowchart of main measurement processing S403 in Embodiment 1.

In the main measurement processing S403 there is acquired a Z stack image for each divisional region as is necessary for depth-of-field extension processing in the subsequent depth extension processing S404. Herein, a Z stack image is image group data that is obtained through imaging of the subject (slide) while changing the focal position in the optical axis direction, such that one Z stack image is made up of image data of a plurality of layers obtained at each focal position. The internal processing of the main measurement processing S403 will be explained with reference to FIG. 8.

Firstly, in S801, an initial position of XY divisional imaging position information that is determined in preliminary measurement processing S402 is read from the image processing apparatus 110, and the controller 108, by way of the stage control 105, causes the stage 203a to move to a position at which an initial divisional imaging region can be shot.

Next, in S802, the Z stack imaging position information of the initial divisional imaging region is read from the image processing apparatus 110, and the controller 108, by way of the stage control 105, causes the stage 203a to move the initial Z position in the same way as in above. In the above-described example, for instance, the stage 203a moves in such a manner that the focal position is matched to a position that is the AF focusing position +0.5×10 [μm].

Next, in S803, image data is acquired. The acquired image data is forwarded from the main measurement unit 101 to the image processing apparatus 110, and is stored in the RAM 302 of the image processing apparatus 110 or in the storage device 113.

Next, in S804, it is determined whether data on all the layer images of the Z stack image, in the current divisional imaging region, have been acquired. If there is data not yet acquired, processing proceeds to S805, and the stage 203a is moved to the next Z position. In the above-described example, for instance, the focal position is reduced in 0.5 μm increments, and a total of 21 layer images are acquired. If in S804 all data is acquired, processing proceeds to S806.

Next, in S806, it is determined whether Z stack images for all divisional imaging regions have been acquired. If there is data not yet acquired, processing proceeds to S807, and the stage 203a is caused to move to the next divisional imaging region. If all items have been acquired, processing is terminated.

The above processing is repeated, to acquire data of a Z stack image for all divisional imaging regions, in the main measurement processing S403.

(Depth Extension Processing S404)

Processing in the depth extension processing S404 involves generating depth-extended image data for which the depth of field is deeper than that in data of layer images that make up the Z stack image acquired in the main measurement processing S403, on the basis of data of these layer images, for each divisional imaging region. Hereafter, layer image data obtained by imaging is also referred to as first image data, and image data generated on the basis of the depth extension processing is also referred to as second image data.

For the sake of a simpler explanation of the present embodiment, an instance will be explained wherein the divisional imaging region is one region (the subject 500 is smaller than the main measurement imaging region 501) and monochrome (gray scale). Imaging is performed in the main measurement processing S403. However, the depth of field of the entire object 500 can also be extended by repeating, for each divisional imaging region, the depth extension processing S404 that is explained hereafter, even in a case where there exists a plurality of divisional imaging regions. Depth of field can be extended for each RGB color in color imaging as well.

The depth extension processing S404 will be explained next with reference to FIG. 9A.

In the depth extension processing S404, firstly, the image processing apparatus 110 acquires, in depth extension characteristic information acquisition processing S901, a depth of field and imaging characteristic information, from depth extension original information that is set in the depth extension setting S401. This processing is explained in detail further on.

Next, in synthesis focal plane/target plane determination processing S902, the image processing apparatus 110 determines a focal plane at a time of image synthesis, i.e. a synthesis focal plane, and a processing target plane at a time of image synthesis, i.e. a synthesis target plane, that are used in a subsequent depth synthesis data generation processing S903. The synthesis focal plane/target plane determination processing S902 is one distinctive processing item in a depth extension algorithm of the present embodiment, by virtue of which the calculation load of the depth-of-field extension processing in the subsequent depth synthesis data generation processing 903 is reduced. This processing is explained in detail further on.

Next, in the depth synthesis data generation processing S903, data having extended depth of field is generated using the synthesis focal plane and synthesis target planes that are determined in the preceding synthesis focal plane/target plane determination processing S902. Various schemes are conceivable as the depth-of-field extension processing that is used in this processing, but in the explanation of the present embodiment these schemes are hereafter narrowed to three methods. However, the schemes are not limited to the explained methods, and instances where other methods are utilized lie also within the scope of the present invention.

(Depth Extension Characteristic Information Acquisition Processing S901)

FIG. 9B illustrates an internal processing flow of the depth extension characteristic information acquisition processing S901.

In depth of field acquisition processing S1001, the image processing apparatus 110 acquires a depth of field from the depth extension original information set in the depth extension setting S401.

In a case where, for instance, objective lens magnification is set as the depth extension original information, the image processing apparatus 110 may determine the depth of field from the objective lens magnification, using a correspondence table in which there is recorded a relationship between objective lens magnification and depth of field in the image processing apparatus 110. A correspondence relationship between depth of field and objective lens magnification, determined by experimentation or calculation beforehand, is described in the correspondence table. The depth of field is determined using the correspondence table in the same way as in a case where the model number of the objective lens in an existent optical microscope, or the type of virtual objective lens, is set as the depth extension original information.

In a case where the objective lens magnification and the aperture stop are set as the depth extension original information, the image processing apparatus 110 acquires a NA corresponding to the objective lens magnification, using the correspondence table, and determines a total NA through multiplication of the rate of change of the NA from the aperture stop. The depth of field D may be determined on the basis of Expression (1).

$$\pm D = n\lambda/\{2(NA)^2\} \quad \text{Expression (1)}$$

n: refractive index of the medium; $\lambda$: wavelength [μm] of the light; NA: numerical aperture of the objective lens The refractive index and the wavelength of the light can be calculated roughly by using the refractive index of an ordinary specimen and by using 0.55 μm as a reference wavelength.

Next, in imaging characteristic acquisition processing S1002, the image processing apparatus 110 determines imaging characteristic information using the depth extension original information. Herein, imaging characteristic information is information that denotes imaging characteristics of a virtual optical system that has a depth of field (depth of field after extension) as designated by the depth extension original information. As the imaging characteristic information there can be used, specifically, information on a plurality of two-dimensional PSFs (Point Spread Functions) information, or information on three-dimensional PSF, that varies with distance from the focal position. The PSF may be given in the form of an OTF (Optical Transfer Function) through frequency transform. These information items can be mapped to the depth extension original information and be stored in the above-described correspondence table. The three-dimensional PSF or three-dimensional OTF, which are imaging characteristics after depth-of-field extension, may be calculated, on the basis of mathematical expressions, from a value (for instance, NA) that is determined based on the depth extension original information.

(Synthesis Focal Plane/Target Plane Determination Processing S902)

The internal processing flow of the synthesis focal plane/target plane determination processing S902 will be explained next with reference to FIG. 9C. The synthesis focal plane/target plane determination processing S902 includes processing of determining a synthesis focal plane corresponding to the focal position of a depth-extended image, on the basis of the depth of field after extension, and processing of selecting, as a synthesis target plane, an image that is used for generation of a depth-extended image, from among all layer images that make up a Z stack image.

Determination processing of the synthesis focal plane will be explained first. Herein, the position of the synthesis focal plane in the Z direction is determined in such a manner that the largest number of objects as observation targets are present within the depth of field (depth of field after extension) centered on the synthesis focal plane.

The image processing apparatus 110 calculates firstly, in image evaluation value calculation processing S1101, image evaluation values of each layer image that makes up the Z stack image. The image evaluation value is an evaluation value for analyzing to what extent an in-focus region is present within a layer image, and is appropriately an in-plane integration value of a sharpness evaluation value for the image. Examples of the sharpness evaluation value include, for instance, a contrast evaluation value that includes image frequency analysis, for instance by Fourier transform, wavelet transform or the like, a computed value by an edge detection filter, typified by a Laplacian filter, or a dispersion value wherein a dispersion of pixel values in a local region is calculated over the entire image.

Figure 10A:
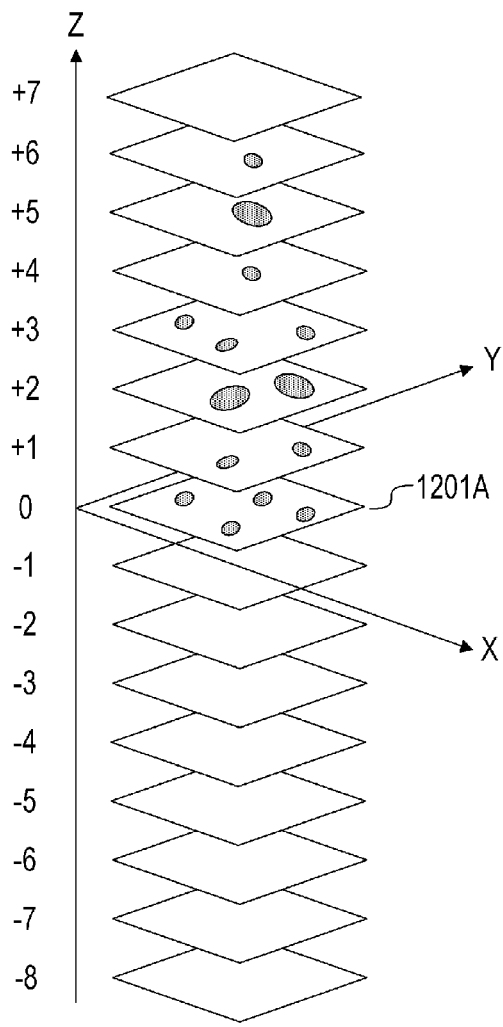
FIGS. 10A and 10B are diagrams for explaining image evaluation value calculation processing S1101 in Embodiment 1.
Figure 10B:
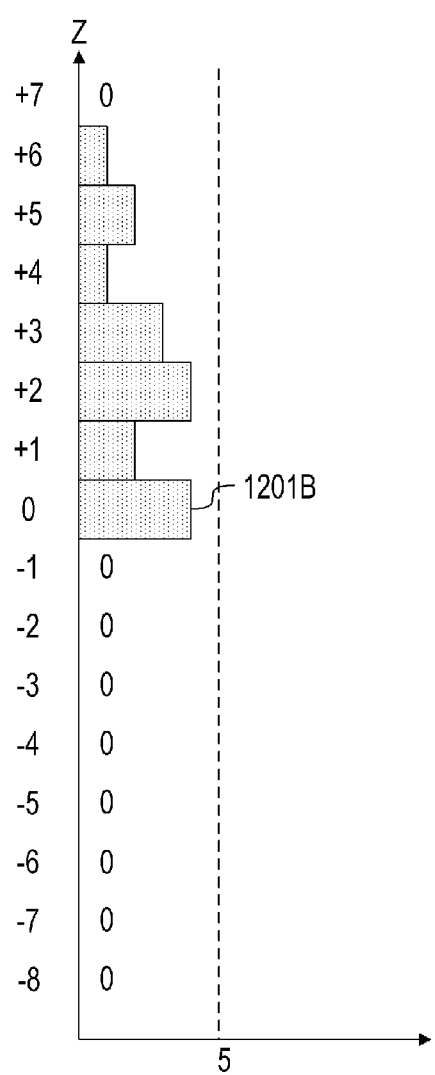

FIG. 10A and FIG. 10B are diagrams illustrating the way in which an image evaluation value is calculated. FIG. 10A illustrates a Z stack image of a specimen that is it imaged in an imaging apparatus while varying the focal position in the Z direction. The Z stack image is made up of 16 layer images. The numbers in the Z-axis are indices for identifying the position of the layer images, and are unitless. FIG. 10B illustrates image evaluation values calculated for respective layer images. The abscissa axis represents image evaluation values and the ordinate axis represents indices that denote the position of the layer images. The image evaluation value in a layer image $1201a$ of FIG. 10A corresponds to the value of $1201b$ in FIG. 10B. The graph in FIG. 10B shows that in-focus bodies are mostly present at Z positions having an index +2 and 0, in the specimen.

Next, in image evaluation integration value calculation processing S1102, the image processing apparatus 110 performs processing of predicting an image evaluation value in the image after extension of the depth of field in the depth extension processing S404. An explanation follows next, with reference to FIG. 11A to FIG. 11C, on the image evaluation integration value calculation processing S1102. FIGS. 11A, 11B and 11C are graphs that illustrate image evaluation integration values in cases where the respective depth of field is one, two, three or images to the front and back (total three, five and seven images, respectively). These graphs result from integrating image evaluation values of adjacent indices, centered on each index, by a corresponding number of depths of field, for each index in FIG. 10B, to yield an estimated value of the image evaluation value at each Z position after depth-of-field extension.

The above processing allows estimating the Z position that is most in focus after depth-of-field extension, also in cases where the objective lens magnification and/or the aperture stop during imaging are different from those after depth-of-field extension. As FIG. 11A to FIG. 11C show, the Z position at which the largest number of the in-focus objects are present (Z position having the greatest image evaluation value) may change when the depth of field changes.

In cases where the depth of field after depth-of-field extension cannot be expressed as an integer multiple of the Z stack spacing (layer image spacing) during imaging, there may be calculated an image evaluation value in the interval of integration, through interpolation of the image evaluation values at each Z position of FIG. 10B, and the result may be integrated, to obtain as a result the image evaluation integration value. The interpolation scheme used herein may be, for instance, a known interpolation scheme such as linear interpolation or spline interpolation.

Processing in synthesis focal plane determination processing S1103 is explained next. In the present processing there is determined a Z position for which the image evaluation integration value as calculated in the preceding image evaluation integration value calculation processing S1102 becomes maximal, and that Z position is set as the focal plane after depth-of-field extension.

In FIG. 11A, the image evaluation integration value is maximal at the Z position represented by index +1. That Z position is thus inferred to be the region that is most in-focus after depth-of-field extension. Accordingly, the synthesis focal plane is determined to be the Z position represented by index +1 in a case where the depth of field is to be extended for one image, front and back (total three images). Likewise, a synthesis focal plane is selected for respective Z positions of index +2, in a case where the depth of field is extended over two images, front and back (total five images), and respective Z positions of index +3, in a case where the depth of field is extended over three images, front and back (total seven images).

Processing in synthesis target plane determination processing S1104 is explained next.

In the synthesis target plane determination processing S1104, the image processing apparatus 110 determines, on the basis of the above-described imaging characteristic information, a range (referred to as 'influence range') over which the influence exerted on the image by an object that is offset, in the optical axis direction, from the focal position (synthesis focal plane), is greater than a predetermined condition. The image processing apparatus 110 selects, as a synthesis target plane, a layer image of which focal position is within the influence range, from among the layer images that make up the Z stack image. The selected synthesis target plane is used in depth-of-field extension processing in subsequent depth synthesis data generation processing S903.

Figure 12A:
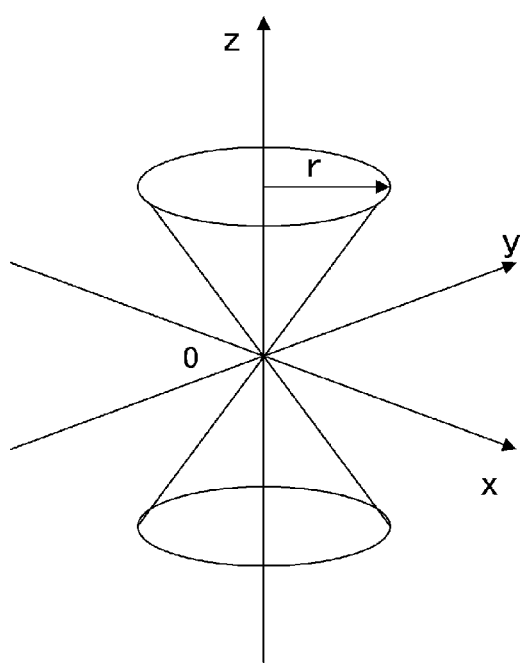
FIGS. 12A and 12B are diagrams for explaining imaging characteristics (PSF) after depth-of-field extension in Embodiment 1.
Figure 12B:
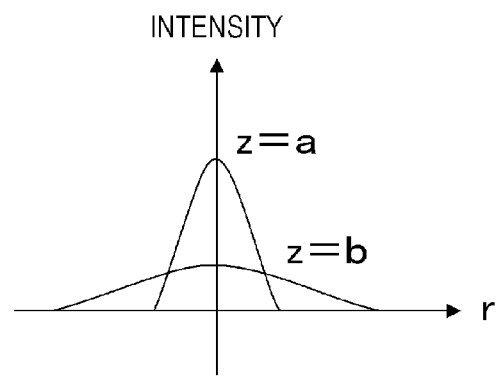

An explanation follows next, with reference to FIG. 12A and FIG. 12B, on an example of the establishment of a predetermined condition and the influence range, as the selection criteria for the synthesis target plane. FIG. 12A and FIG. 12B are diagrams illustrating imaging characteristics (PSF) after depth-of-field extension (i.e. of the virtual optical system), as calculated in the imaging characteristic acquisition processing S1002.

The cone in FIG. 12A illustrates the way in which the PSF widens with increasing distance from the focal position (origin in the figure). FIG. 12B illustrates a two-dimensional PSF (abscissa axis: r, ordinate axis: intensity), in the three-dimensional PSF illustrated in FIG. 12A, for two planes Z=a and Z=b (a<b) having dissimilar distances from the origin. Herein, Z=a denotes a two-dimensional PSF of a plane in the depth of field, and Z=b denotes a two-dimensional PSF of a plane outside the depth of field. The image intensity at the origin (center pixel), where Z=b, is considerably smaller than that at Z=a. As can be predicted on the basis of such a PSF shape, it can be estimated that objects at a position |Z|>b do not exert a significant influence on image quality at the focal plane in the image after depth-of-field extension, since such objects are merely superimposed with substantial blurring on the image.

Herein, an image quality influence evaluation index, with respect to focal position, of an object at the position spaced apart from the focal position is defined as, for example, an intensity ratio of intensity of the center of the PSF (center pixel of the image sensor) at the position spaced apart from the focal position, with respect to that at the focal position. The influence on image quality on the focal plane can be neglected if the intensity ratio at the center is no greater than $1/N$. Any value (positive real number) can be set as N, but it suffices to work out an appropriate value on the basis of, for instance, image quality evaluation experiments or simulations for images after depth-of-field extension. In the present embodiment there is set N=10.

An image at the synthesis focal plane can be reproduced, with good precision, if there is used at least an image lying within the range |Z|<b, where Z=b is a distance from the focal position at which the intensity ratio at the center of the PSF in FIG. 12A is $1/N$. Therefore, image quality can be preserved and thus computational cost can be reduced, through reduction in the number of syntheses, by defining a layer image that lies within the range |Z|<b, and through input thereof into the depth synthesis data generation processing S903. In this example, the "intensity ratio 1/N at the center of the PSF" corresponds to the above-described predetermined condition, and the "|Z|<b range" corresponds to the influence range.

In the present embodiment, as described above, the number of layer number images that are used in depth extension processing is reduced by taking into account the contribution to image quality of the depth-extended image in the synthesis target plane determination processing S1104. As a result, processing can be made faster in the subsequent depth synthesis data generation processing S903, as compared with conventional methods (methods that utilize all the layer images that make up the Z stack image).

The image quality influence evaluation index at the focal position is not limited to that in the above-described method. For instance, an evaluation index may be established in the form of an MTF (modulation transfer function), for a designated frequency, at a position spaced apart from the focal position, and a range equal to or greater than 10% may be established as the synthesis target plane. An evaluation index may be set in the form of an integration value of the product of an MTF by a human visual characteristic, and the synthesis target planes may be established according to a threshold value that is based on a human perception characteristic. Many other variations are conceivable. Therefore, instances where the synthesis focal plane is established using evaluation indices other than the above-described ones lie as well within the scope of the present invention. In terms of striking a balance between image quality and speed, the number of processes can be further reduced, and speed further increased, through thinning of some images from the synthesis target planes established as described above.

The synthesis target plane determination processing that utilizes the above-described image quality influence evaluation index is not essential. Specifically, instead of synthesis target plane determination processing after a synthesis focal plane has been established, it is also possible to set, as the synthesis target plane, all layer images that make up the Z stack image, for each divisional region, and to set uniformly layer images within a given range that is established beforehand, taking the synthesis focal plane as the center. In this method, the number of processes may increase as compared with a method in which the synthesis target planes are selected using the above-described image quality influence evaluation index, but the method is advantageous in that it allows simplifying circuit configuration and realizing stable operation, with reduced branch processing by condition determination. Both methods are advantageous in that they allow reducing the calculation load in the subsequent depth synthesis data generation processing S903 by establishing a synthesis focal plane.

Figure 13:
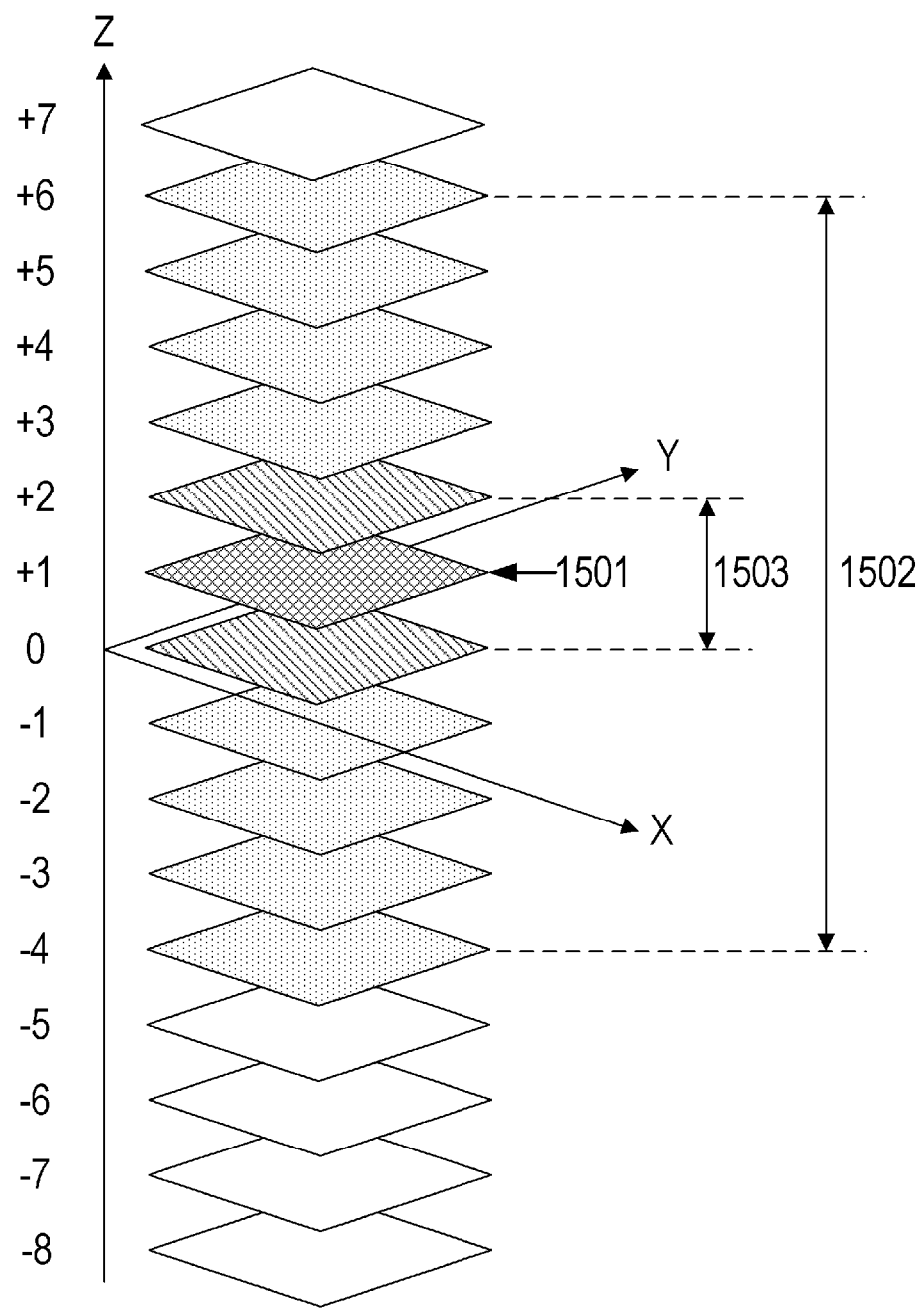
FIG. 13 is a diagram for explaining a synthesis focal plane and synthesis target planes in Embodiment 1.

FIG. 13 is a schematic diagram for explaining information that is determined in the synthesis focal plane/target plane determination processing S902. In the figure, the reference numeral 1501 denotes a synthesis focal plane, 1502 denotes synthesis target planes and 1503 represents depth of field after extension. When mapped to the above-described numerical values, b=5 (total 11 images) for 1502, and a=1 (total 3 images) for 1503.

(Depth Synthesis Data Generation Processing S903)

Figure 14:
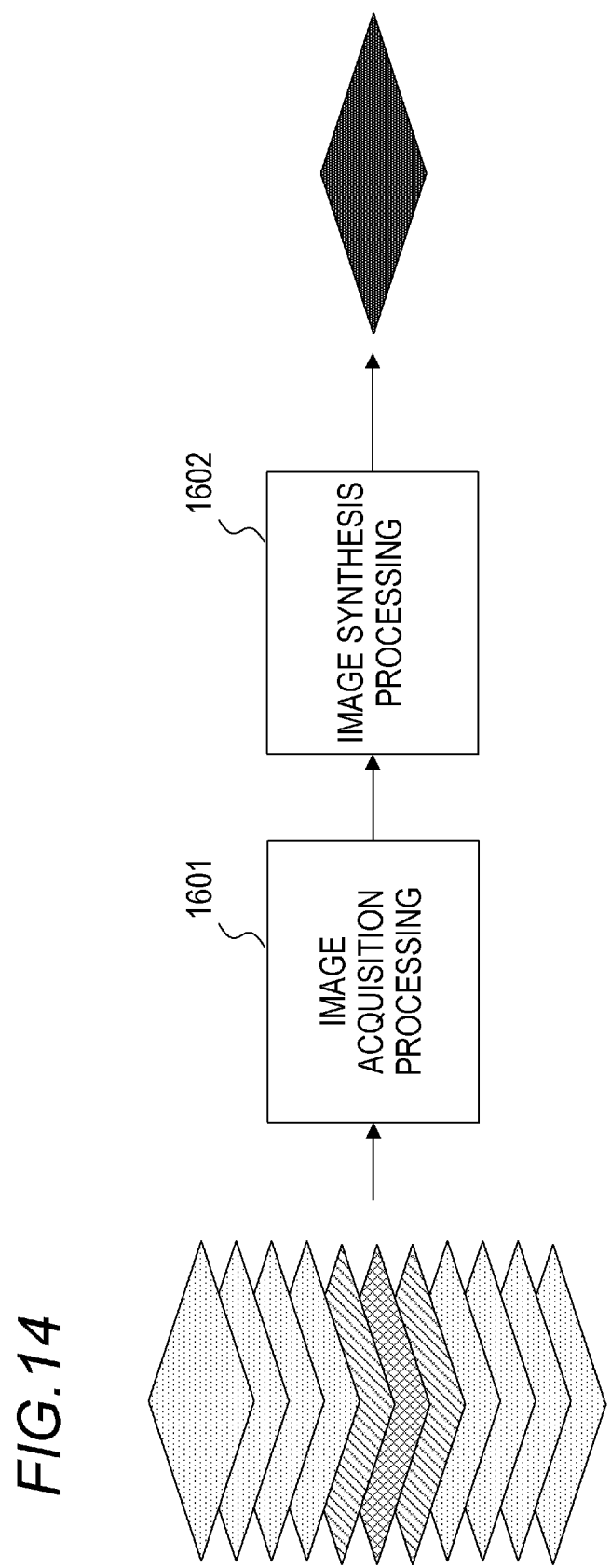
FIG. 14 is a block diagram of depth synthesis data generation processing S903 in Embodiment 1.

FIG. 14 is a block diagram illustrating internal processing in the depth synthesis data generation processing S903.

In image acquisition processing 1601, the image processing apparatus 110 acquires, from the storage device 113 or the RAM 301 of the image processing apparatus 110, information on the synthesis focal plane as well as data on layer images at the synthesis target plane.

Next, in image synthesis processing 1602, the image processing apparatus 110 processes layer image data of the synthesis target plane, and outputs image data having extended depth of field.

Various schemes can be used as the internal processing in the image synthesis processing 1602. Examples include, for instance, (1) a select-and-merge method based on evaluation values, (2) a weighting synthesis method, and (3) a three-dimensional filtering method. The explanation in the present embodiment will focus on instances where the three methods are used. Instances where depth-of-field extension methods are used other than the abovementioned ones lie also within the scope of the present invention.

(1) Select-and-Merge Method Based on Evaluation Values

Figure 15C:
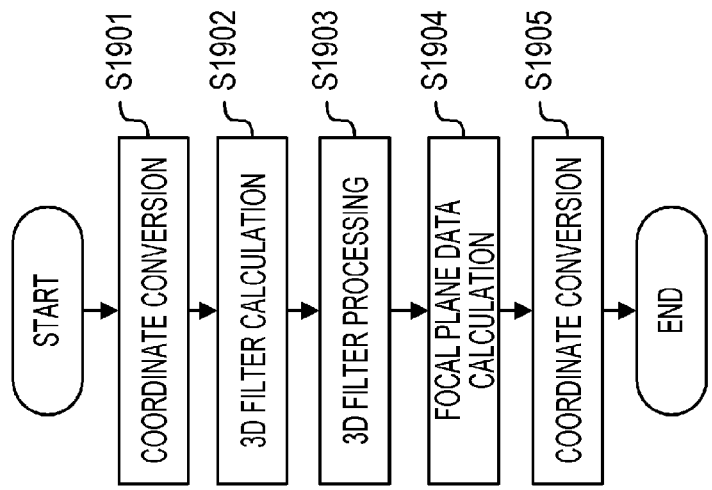
FIGS. 15A to 15C are flowcharts of three methods of image synthesis processing in Embodiment 1.
Figure 15B:
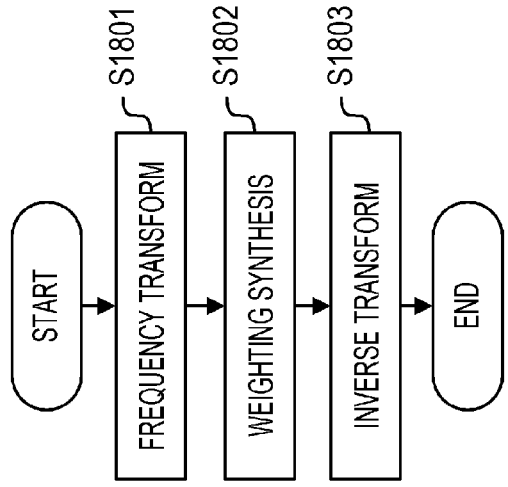
Figure 15A:
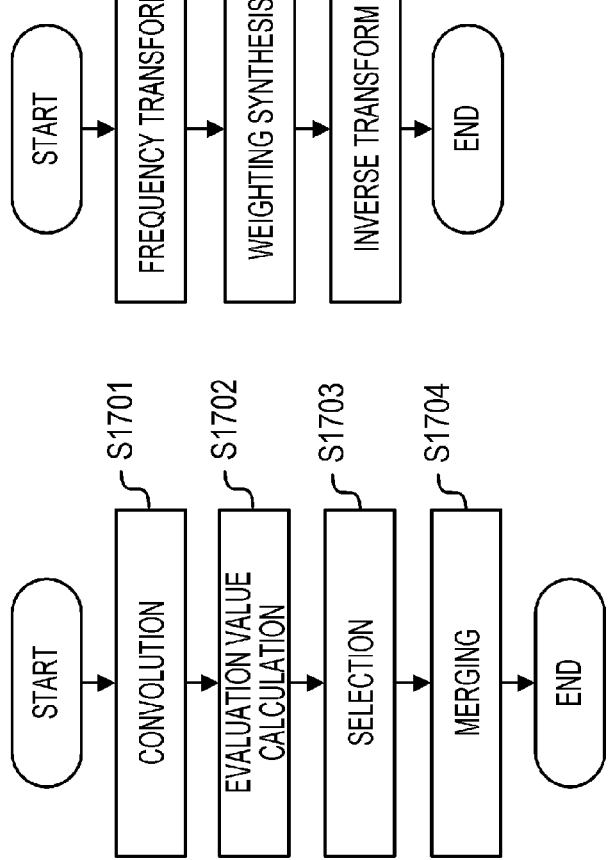

An explanation follows next, with reference to FIG. 15A, on an example of the select-and-merge method (1) based on evaluation values. In Method (1), blurring according to the distance from the focal position (synthesis focal plane) is imparted to each synthesis target plane by using convolution processing that is based on imaging characteristics of the virtual optical system corresponding to depth of field after extension.

Firstly, in convolution processing S1701, the image processing apparatus 110 acquires imaging characteristic information determined in the imaging characteristic acquisition processing S1002, i.e. acquires $w_n(x, y)$, which are two-dimensional PSFs after depth-of-field extension at the Z position at a time where the synthesis focal plane is set as the origin.

Next, the image processing apparatus 110 performs convolution of the $w_n(x, y)$ for the layer images $g_n(x, y)$ of the synthesis target planes, and imparts blurring to each layer image according to the distance from the synthesis focal plane. This can be expressed by Expression (2) below.

[Math. 1]

$$A_n(x,y)=g_n(x,y)**w_n(x,y) \hspace{2em} \text{Expression (2)}$$

In Expression (2), ** denotes a convolution operation, and n denotes an index for identifying the position of the layer images.

As a result, the layer images at each Z position, as captured through focusing at each respective Z position, are corrected (converted) to images having blurring corresponding to the depth-of-field extension amount that is set by the user, according to the distance from the synthesis focal plane.

Next, in evaluation value calculation processing S1702, the image processing apparatus 110 calculates an image evaluation value for each layer image that has been subjected to the convolution processing. The image evaluation value is a value that is suitable for extraction of a high-sharpness position within the image, i.e. an in-focus position. Herein there can be used the sharpness evaluation value mentioned in the synthesis focal plane/target plane determination processing S902. The image evaluation value is calculated for the horizontal (XY) position of each pixel in the layer image.

Next, in selection processing S1703, the image processing apparatus 110 compares image evaluation values between layer images of the synthesis target planes, and specifies a Z position at which the image evaluation value is highest. Image evaluation values are compared for a same XY position within the images, and a Z position is selected that yields the highest image evaluation value, for each XY position. The results are outputted as a Z position map that denotes a correspondence between XY position and the selected Z position.

Image quality of the synthesis image can drop through abrupt changes in the Z position within the image plane, on account of the influence of noise or the like, upon extraction of the Z position having the sharpest evaluation value, at each XY position. Accordingly, for instance a spatial filter (noise suppression filter) is preferably used in the Z position map, to curb abrupt changes in the Z position. A median filter, a bilateral filter or the like may also be used as the noise suppression filter.

Next, in merging processing S1704, the image processing apparatus 110 extracts a pixel value at the Z position that is described in the Z position map, from a layer image group of synthesis target planes, for each XY position, and generates a synthesis image by merging the extracted pixel values. Processing is performed herein in pixel units, but the calculation load can be reduced by similarly performing processing in pixel block units of a predetermined size.

(2) Weighting Synthesis Method

An explanation follows next on an example of a weighting synthesis method (2) with reference to FIG. 15B.

The method (2) is a method for weighted addition of layer images of synthesis target planes on the frequency space, using weights that are determined on the basis of the imaging characteristics of the virtual optical system. Specifically, each of the plurality of layer images that constitute the synthesis target planes is subjected to a two-dimensional discrete Fourier transform, and the results undergo weighted addition in accordance with the focal position after depth-of-field extension, and a synthesis image (depth-extended image) is generated by performing two-dimensional inverse discrete Fourier transform. In the explanation hereafter, discrete Fourier transform will be notated as DFT, and inverse discrete Fourier transform as IDFT.

Firstly, in frequency transform processing S1801, the image processing apparatus 110 performs two-dimensional DFT on layer images $g_n(x, y)$ at each Z position (n). As a result, there are generated two-dimensional DFT images $G_n(u, v)$ in proportion to the number of synthesis target planes.

Next, in weighting synthesis processing S1802, the image processing apparatus 110 multiplies each of the two-dimensional DFT images $G_n(u, v)$ by a weighting function $W_n(u, v)$ having a coefficient for each spatial frequency component. Thereafter, synthesis frequency data $A(u, v)$ is generated through totaling of all images. Expressed mathematically, this is given by Expression (3) below.

[Math. 2]

$$A(u, v) = \sum_{n=1}^{Ns} G_n(u, v) * W_n(u, v) \qquad \text{Expression (3)}$$

Ns: number of images in the synthesis target planes

The depth of field may be modified by modifying the weighting function $W_n(u, v)$ having a coefficient for each spatial frequency component.

Ordinarily, the MTF of an image decreases with increasing distance from the focal position. Therefore, the weighting function $W_n(u, v)$ may be set in such a way so as to decrease with increasing distance from the synthesis focal plane. Various functions may be used in the weighting function $W_n(u, v)$, but, for instance, the weighting function $W_n(u, v)$ may be determined using a two-dimensional OTF that changes according to the distance from the focal position, as acquired in the imaging characteristic acquisition processing S1002.

Lastly, in inverse frequency transform processing S1803, the image processing apparatus 110 performs two-dimensional IDFT on the synthesis frequency data $A(u, v)$, to obtain images $a(x, y)$ having extended depth of field.

(3) Three-Dimensional Filtering Method

An example of a three-dimensional filtering method (3) will be explained next with reference to FIG. 15C. The method referred to herein as three-dimensional filtering method is the method set forth in PTL2.

In the present method, firstly, the image processing apparatus 110 performs coordinate conversion processing S1901 on each of the layer images $g_n(x, y)$ of the synthesis target planes. The three-dimensional filter processing yields conversion to a format $g(X, Y, Z)$ that is amenable to depth-of-field extension. The present processing is not necessary if image magnification does not vary with the Z position. The processing in S1901 is omitted in such a case.

Next, in three-dimensional filter calculation S1902, the image processing apparatus 110 calculates a three-dimensional filter necessary for depth-of-field extension. The three-dimensional filter can be calculated using $Ha(u, v, w)*H(u, v, w)^{-1}$, wherein $H(u, v, w)$ is the three-dimensional OTF upon imaging in the imaging optical system 205a, and $Ha(u, v, w)$ is the three-dimensional OTF of the shot image having extended depth of field. The filter is a filter having a function of cancelling of blurring that is based on the imaging characteristics of the imaging optical system 205a used for capturing the layer images and adding blurring that is based on the imaging characteristics of the virtual optical system.

Values determined beforehand regarding $H(u, v, w)$, which are the three-dimensional OTF upon imaging in the imaging optical system 205a, are stored in the ROM 303 of the image processing apparatus 110 or in the storage device 113, and are used by being read in the image synthesis processing 1602. Values acquired in the imaging characteristic acquisition processing S1002 are set to the $Ha(u, v, w)$, which are the three-dimensional OTF of the shot image having extended depth of field.

Next, in three-dimensional filter processing S1903, the image processing apparatus 110 performs three-dimensional DFT on $g(X, Y, Z)$, to calculate $G(u, v, w)$. Thereafter, the three-dimensional filter $Ha(u, v, w)*H(u, v, w)^{-1}$ determined in the three-dimensional filter calculation S1902 is multiplied by the resulting $G(u, v, w)$, to determine a three-dimensional DFT image $A(u, v, w)$ having extended depth of field.

[Math. 3]

$$A(u,v,w) = Ha(u,v,w) * H(u,v,w)^{-1} * G(u,v,w) \qquad \text{Expression (4)}$$

Next, in focal plane data calculation processing S1904, the image processing apparatus 110 performs, in principle, three-dimensional IDFT on the $A(u, v, w)$; as a result there can be calculated extended depth-of-field images $a(X, Y, Z)$ in a coordinate conversion space.

[Math. 4]

$$a(X,Y,Z) = F^{-1}\{A(u,v,w)\} \qquad \text{Expression (5)}$$

Herein, $F^{-1}\{\ \}$ denotes three-dimensional IDFT.

However, as described above, three-dimensional IDFT is used for variables u, v, w (variables after frequency transform for X, Y, Z, respectively). Thus, computational cost increases, and calculation time is required, upon subsequent extraction of the images $a(X, Y, P)$ at the synthesis focal plane (z=p before conversion, Z=P after conversion).

Three-dimensional DFT (IDFT) can be realized through sequential one-dimensional DFT (IDFT) of respective variables u, v, w. Accordingly, there is calculated a one-dimensional IDFT value for only the synthesis focal plane Z=P, without performing one-dimensional IDFT on all elements of the variable w in $A(u, v, w)$, and one-dimensional IDFT is performed on variables u, v, to calculate a(X, Y, P). The computational cost can be kept small as a result.

Lastly, in coordinate conversion processing S1905, the image processing apparatus 110 performs coordinate conversion processing on image data of the synthesis focal plane, to calculate a(x, y, p). The present processing in S1905 can be omitted, as in the case of S1901, if no space conversion processing is required.

Three methods that can be used in the depth synthesis data generation processing S903 have been explained above. In each method, computational cost can be curbed, and calculation time can be shortened, by establishing a synthesis focal plane and synthesis target planes in a preceding synthesis focal plane/target plane determination processing S903.

In a case where no synthesis focal plane is established beforehand, depth-of-field extension processing is required for a plurality of assumed focal planes. This is problematic on account of the computational cost involved. In the method of the present embodiment, the computational cost of depth-of-field extension processing can be significantly reduced, and the throughput and response speed of the imaging apparatus can be increased, through prediction of the synthesis focal plane using image data of shallow depth of field, which represents the internal structure of the specimen relatively well.

In the depth synthesis data generation processing S903, DFT that is used in methods (2) and (3) entails some calculation load, and hence the main measurement processing S403 and the depth extension processing S404 may be processed in a pipelined manner. In the main measurement processing S403, for instance, the two-dimensional DFT may be performed on already-acquired image data, in the lapse until acquisition of image data of a next Z position. After having proceeded onto Z stack image acquisition of a next divisional imaging region, the depth extension processing S404 may be performed on a Z stack image of an already-acquired divisional imaging region. The calculation time in the depth synthesis data generation processing S903 of the depth extension processing S404 can be shortened, and the response speed can be increased, by resorting to the above-described parallel processing.

In the present embodiment, an instance has been explained of monochrome imaging in the main measurement processing S403, but processing can be supplemented in a case of color imaging. In color imaging, preferably, the synthesis focal plane and the synthesis target planes are set so as to share RGB. For instance, the synthesis focal plane and the synthesis target planes may be determined using an image of any one channel (G), whereupon the planes are used shared across RGB. The imaging characteristic information (PSF) may be shared across RGB, or may vary for each RGB. In a case of a shared setting, for instance, the PSF of any one channel (G) may be used shared across RGB. In a case where the imaging characteristic information (PSF) varies for each RGB, respective imaging characteristic information is determined for each RGB in the depth extension characteristic information acquisition processing S901, and the depth synthesis data generation processing S903 is carried out for each RGB using the respective information.

Herein, color imaging is not limited to three RGB colors. In a case where the light source 201a comprises a light source of a plurality of wavelengths or comprises a color filter, then imaging (multi-band imaging) is possible for a plurality of wavelengths, and depth synthesis data generation processing can be performed for each of the plurality of wavelengths, in the same way as for RGB.

The features of the present embodiment make it possible for images that are captured using the imaging optical system 205a, having high resolution, to be quickly corrected, and outputted, as images having extended depth of field according a set value desired by the user. The present embodiment elicits thus the effect of improving the diagnosis efficiency of the specimens for the user (pathologist).

[Embodiment 2]

An explanation follows next on a depth-of-field extension method in a case where the Z position of the synthesis focal plane varies significantly between divisional imaging regions in the main measurement processing S403 in the present embodiment. The configuration of the present embodiment allows realizing the effect of increasing diagnosis efficiency for the user (pathologist) through generation of defocusing-free clear images at the focusing position, even in cases of slide waviness or ruggedness, or of substantial distribution position variability in cells and tissue within a specimen.

FIG. 16A illustrates the internal processing flow of the depth extension processing S404 in the present embodiment.

In depth extension characteristic information acquisition processing S2001, the image processing apparatus 110 acquires depth of field and imaging characteristic information after depth extension processing in accordance with a method identical to that of S901. Such processing is identical to that described above, and a detailed explanation thereof will be omitted.

Next, in intra-region sub-division processing S2002, the image processing apparatus 110 further performs sub-division processing, within a region, on the divisional imaging regions that are established in the main measurement processing S403.

Next, in S2003, the image processing apparatus 110 selects a sub-divisional region that constitutes an initial processing target, from among the plurality of sub-divisional regions that are created in S2002. For the sub-divisional region to be processed, the image processing apparatus 110 determines the synthesis focal plane and synthesis target planes (S2004), and generates depth synthesis data having extended depth of field (S2005). Processing in the synthesis focal plane/target plane determination processing S2004 and the depth synthesis data generation processing S2005 is identical to that in S902 and S903 of Embodiment 1, and will not be explained again. Processing in S2004 and S2005 is executed, through loop processing (S2006, S2007), for all the sub-divisional regions established in the intra-region sub-division processing S2002.

The details of the intra-region sub-division processing S2002 are explained next with reference to FIG. 16B, FIG. 17A and FIG. 17B.

In initial division processing S2101, the image processing apparatus 110 sub-divides the interior of each region, in pre-determined region sizes established beforehand. For instance, if the main measurement imaging region 504 has a pixel count of 2048×2048 pixels, and the sub-divisional region size is 512×512 pixels, then the present processing can yield 16 sub-divisional regions.

Next, in image evaluation value calculation processing S2102, the image processing apparatus 110 calculates an image evaluation value for each sub-divisional region (16 sub-divisional regions) of each layer image. Next, in image evaluation integration value calculation processing S2103, the image processing apparatus 110 calculates an image evaluation integration value for each Z position of each sub-divisional region, from the image evaluation values determined in S2102. Next, in synthesis focal plane determination processing S2104, the image processing apparatus 110 determines a Z position for which the image evaluation integration value is maximal, for each sub-divisional region, and determines this Z position as the synthesis focal plane that is the focal plane after depth-of-field extension. Processing in S2102, S2103 and S2104 corresponds to processing in S1101, S1102 and S1103 of FIG. 9C explained for Embodiment 1.

Next, in adjacent region difference calculation processing S2105, the image processing apparatus 110 calculates a difference in the Z position of the synthesis focal plane of adjacent sub-divisional regions. Next, in threshold value determination S2106, the image processing apparatus 110 terminates the region division processing if the difference in Z position of adjacent synthesis focal planes is smaller than a threshold value, for all the sub-divisional regions. If even one Z position difference is equal to or greater than the threshold value, processing proceeds to re-division processing S2107, where division is performed according to a finer divisional region size (for instance, 256×256 pixels, which is the half of 512× 512 pixels), and processing continues from the image evaluation value calculation processing S2102 onwards.

The depth of field after depth extension processing is an example of the threshold value used in the threshold value determination S2106. Unnoticeable joints can be formed between sub-regions if the difference in synthesis focal planes between the sub-divisional regions fall within the depth of field, even after extension of the depth of field. Alternatively, a given distance value set beforehand can be used as the threshold value.

Various values can be set as the sub-divisional region size that is used anew in the re-division processing S2107. For example, the size is set to half the current divisional region size. For instance, re-division to 256×256 pixels is performed in a case where the difference is equal to or greater than the threshold value at a 512×512 pixel division. Re-division is repeated thereafter, to 128×128 pixels, 64×64 pixels, 32×32 pixels, until the difference in the Z positions of synthesis focal planes between adjacent sub-divisional regions is smaller than the threshold value.

Figure 17A:
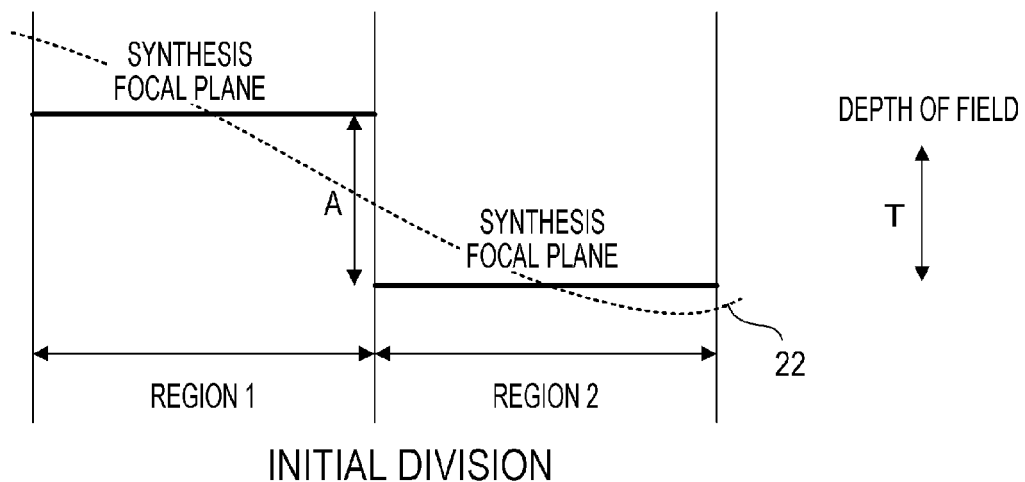
FIGS. 17A and 17B are diagrams for explaining intra-region sub-division processing S2002 in Embodiment 2.
Figure 17B:
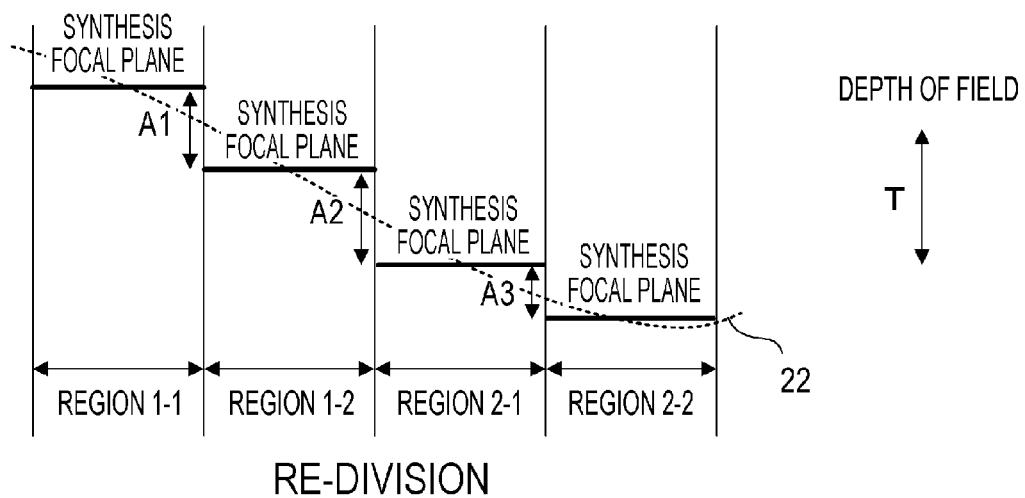

FIG. 17A and FIG. 17B are one-dimensional schematic diagrams for explaining the sub-division processing in the intra-region sub-division processing S2002. Regions 1 and 2 in FIG. 17A denote sub-divisional regions into which the main measurement imaging region 504 is divided in the initial division processing S2101. A dotted line 22 depicts schematically the distribution of objects (tissue or cells) in a specimen. In FIG. 17A, 'a' denotes the difference in adjacent synthesis focal planes of regions 1 and 2, such that the difference a is greater than the depth of field t after depth-of-field extension. In a case where t is set as the threshold value, regions 1 and 2 are re-divided into halved sub-divisional regions, as illustrated in FIG. 17B. The differences in adjacent synthesis focal planes at regions 1-1, 1-2, 2-1 and 2-2, into which regions 1 and 2 are sub-divided, are a1, a2 and a3, respectively, which are all smaller than the depth of field t as the threshold value.

In the present embodiment a method has been explained that involves re-dividing one divisional imaging region, but instances are conceivable wherein the differences in synthesis focal plane between adjacent divisional imaging regions are equal to or greater than the threshold value t. Therefore, additional processing for re-division of such divisional imaging regions may be provided if the calculated differences in synthesis focal plane between adjacent divisional imaging regions, in the intra-region sub-division processing S2002, are equal to or greater than the threshold value t.

By introducing the intra-region sub-division processing S2002, the present embodiment allows generating extended depth-of-field images in which the entire specimen area is in focus, with smooth joints, irrespective of slide waviness or ruggedness, and irrespective of distribution position variability of tissue or cells in the specimen.

[Embodiment 3]

An explanation follows next of processing, in the depth extension setting S401 of the present embodiment, that enables designating the depth extension original information that corresponds to a plurality of depth of fields, and generating a plurality of extended depth-of-field images. Generating a plurality of extended depth-of-field images having dissimilar depths of field makes it possible to generate, at one time, images that are obtained through the operation of an optical microscope, and to afford the effect of enhancing diagnosis efficiency for the user that utilizes the virtual slide.

The flow of processing will be explained with reference to FIG. 9A. Firstly, in the depth extension characteristic information acquisition processing S901, the image processing apparatus 110 acquires imaging characteristic information and a plurality of depths of field from depth extension original information that is set in depth extension setting S401. Next, in the synthesis focal plane/target plane determination processing S902, the image processing apparatus 110 sets the synthesis focal plane and synthesis target planes for each depth extension original information item. Next, in the depth synthesis data generation processing S903, the image processing apparatus 110 generates a plurality of depth-of-field extended images using the imaging characteristic information and plurality of depths of field determined in S901. Processing in S901 to 903 is no different from that of Embodiments 1 and 2, except that now calculations are performed for each item in the plurality of depth extension original information items. An explanation of the processing will thus be omitted.

The image data generated as described above is explained next.

Figure 18A:
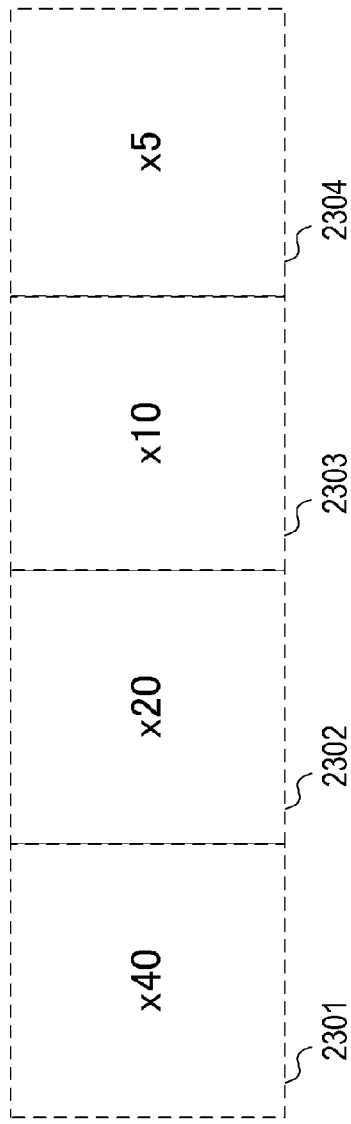
FIGS. 18A and 18B are diagrams for explaining a plurality of image outputs having varying depth of field in Embodiment 3.

FIG. 18A illustrates an example of the calculation, with identical image sizes, of images of a depth of field corresponding to objective lens magnifications 40×, 20×, 10× and 5×, from Z stack images shot at objective lens magnification 40×. The reference numerals 2301, 2302, 2303 and 2304 denote images having depths of field corresponding to objective lens magnifications 40×, 20×, 10× and 5×. No depth-of-field extension processing is necessary for 40× image data 2301, and layer images at the synthesis focal plane position are used as-is. The plurality of images having thus the same image size but varied depth of field are effective for presenting depth information of the specimen to the user that, thanks to blurring in order to, is close to that of images that are obtained by switching the aperture stop in the operation of an optical microscope.

Figure 18B:
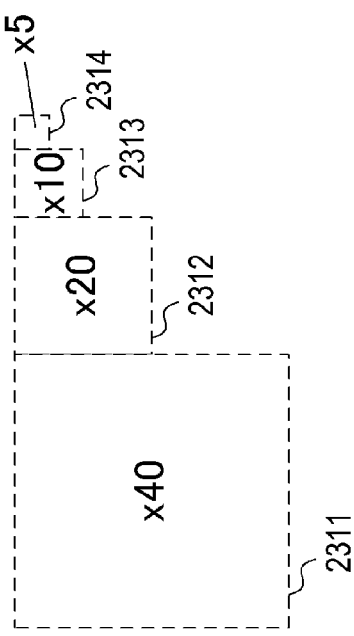

FIG. 18B illustrates an example of an instance where images having a depth of field corresponding to objective lens magnifications 40×, 20×, 10× and 5× are reduced according to the objective lens magnification, and are calculated, out of Z stack images that are shot at an objective lens magnification 40×. The reference numerals 2311, 2312, 2313 and 2314 denote images having depths of field corresponding to objective lens magnifications 40×, 20×, 10× and 5×. As illustrated in the figure, one side in images 2312, 2313 and 2314 is ½, ¼ and ⅛, respectively, of one side in image 2311.

As FIG. 18B shows, a wide field of view can be displayed, upon display of an image across the entire screen of the display 112, by reducing the image size according to the ratio of objective lens magnification during shooting. Therefore, storing hierarchically, in a file, data referring to reducing the image size according to the objective lens magnification makes it possible to display, at high speed, low-magnification observed images (deep depth of field and wide field of view)

as well as high-magnification observed images (shallow depth of field and narrow field of view), of an optical microscope, while keeping data volumes small.

The reduction of image size illustrated in FIG. 18B is realized in the depth synthesis data generation processing S903. There is a plurality of timings for reduction processing of image sizes. In a simple implementation, reduction processing (not shown) according to objective lens magnification can be inserted after the image synthesis processing S1602 of FIG. 14.

However, calculation speed can be increased through reduction before processing with a large calculation load in the image synthesis processing S1602. For instance, the computational cost of convolution upon processing after reduction of the layer images and two-dimensional PSF, can be cut, in accordance with the objective lens magnification, in a case where the select-and-merge method (1) based on evaluation values is used as the internal processing in the depth synthesis data generation processing S903.

In a case where the weighting synthesis method (2) or the three-dimensional filtering method (3) is used, then only low-frequency component regions corresponding to the reduced image size, centered on the origin, in the frequency domain, are targets for processing, and inverse transform may be performed only for these regions to be processed. Reduced synthesis images can thus be obtained by lowering the calculation load of inverse Fourier transform. In the explanation of example (2), when the ratio between the objective lens magnification during imaging and the objective lens magnification after depth-of-field extension is 1/N, frequency data may be acquired for the range of image size 1/N, centered on the origin, from among synthesis frequency data A(u, v), and an inverse Fourier transform may be performed thereupon only for the components in the acquired frequency data. In (3) as well, the range of the UV plane of inverse Fourier transform may be frequency data of image size 1/N, centered on the origin, from among the three-dimensional Fourier transform images.

In the present embodiment, the plurality of objective lens magnifications and aperture stops can be set so as to yield a common synthesis focal plane. A common synthesis focal plane is advantageous in that a visual effect can be elicited thereby that is identical to that of an instance where the objective lens magnification and aperture stop of an optical microscope are adjusted, upon switching and display of a plurality of extended depth-of-field images on the screen.

In a simple method, the synthesis focal plane for an instance where the depth of field is shallowest may be used as the common focal plane. In another method, a value resulting from multiplying image evaluation integration values determined for each objective lens magnification by a weight, and summating the results, is taken as a new image evaluation integration value that serves as the basis for establishing the synthesis focal plane. The image evaluation integration values for objective lens magnifications 40×, 20×, 10× and 5× are set to Ea(z), Eb(z), Ec(z) and Ed(z), respectively. Herein, one synthesis focal plane may be established, regardless of magnification, by using a new image evaluation integration value f(z) given by Expression (6) below.

[Math. 5]

$$f(z)=W_a Ea(z)+W_b Eb(z)+W_c Ec(z)+W_d Ed(z) \quad \text{Expression (6)}$$

(Wa, Wb, Wc and Wd are weight coefficients) In Expression (6), the position of the synthesis focal plane can be controlled by increasing the weight coefficients of overlapping magnifications.

By virtue of the features of the present embodiment, operability similar to that of an optical microscope can be provided on the image processing apparatus 110, and an effect of increasing the diagnosis efficiency for the user (pathologist) can be afforded, by generating a plurality of images of modified depth of field, from Z stack images, and storing the images in a file.

[Embodiment 4]

In Embodiments 1 to 3, instances have been explained wherein one synthesis focal plane is set for one depth of field. In the present embodiment, an instance will be explained wherein a plurality of synthesis focal planes is set for one depth of field, to generate Z stack images having extended depth of field.

The flow of processing will be explained with reference to FIG. 9A. Firstly, in the depth extension characteristic information acquisition processing S901, the image processing apparatus 110 acquires imaging characteristic information and depth of field from depth extension original information that is set in depth extension setting S401. Next, in the synthesis focal plane/target plane determination processing S902, the image processing apparatus 110 determines a synthesis focal plane and synthesis target planes in accordance with the same method as in Embodiment 1. In the present embodiment, the image processing apparatus 110 determines a plurality of synthesis focal planes and synthesis target planes from a Z stack number designated beforehand by the user. The Z stack number is set in the depth extension setting S401.

The internal processing flow of the synthesis focal plane/target plane determination processing S902 in the present embodiment will be explained next with reference to FIG. 9C. Herein, the image evaluation value calculation processing S1101 and the image evaluation integration value calculation processing S1102 are identical to those of Embodiment 1 and will not be explained again.

In the synthesis focal plane determination processing S1103, the image processing apparatus 110 determines the synthesis focal plane in accordance with the same method as in Embodiment 1, and sets the determined plane as a first synthesis focal plane. Next, the image processing apparatus 110 determines a plurality of synthesis focal planes according to the Z stack number that is set in the depth extension setting S401.

In a case where, for instance, the user designates "Z stack number 3 at m [µm] spacing", the image processing apparatus 110 sets second and third synthesis focal planes spaced apart by m [µm] up and down in the Z direction, with respect to the first synthesis focal plane at the center. In a case where no layer image is present at the designated position, the synthesis focal plane is set at the Z position of the layer image that is closest to the designated position. The depth-of-field distance after depth-of-field extension can be set for the Z stack spacing through setting in the depth extension setting S401. A value determined in the depth extension characteristic information acquisition processing S901 is used herein as the value of the depth of field.

Next, in the synthesis target plane determination processing S1104, the image processing apparatus 110 sets respective synthesis target planes for the plurality of synthesis focal planes that have been established in the previous stage. The synthesis target planes are determined individually for the respective synthesis focal planes. The manner in which the synthesis target planes are determined is identical to that of Embodiment 1, and will not be explained again.

As described above, a plurality of image data items having extended depth of field is generated in the depth synthesis data generation processing S903, using data on the synthesis target planes and information on the plurality of synthesis focal planes as established in the synthesis focal plane/target plane determination processing S902, and the generated image data is outputted in the form of Z stack images. Herein, the depth-of-field extension processing from the respective synthesis focal planes and synthesis target planes is executed a plurality of times. The various processing instances are identical to those of Embodiment 1, and will not be explained again.

A method has been thus explained in which a plurality of image data (Z stack) having extended depth of field is generated for one depth of field.

In the present embodiment as well, as in Embodiment 1, establishing beforehand synthesis focal planes and synthesis target planes has the effect enhancing the throughout and response speed of the imaging apparatus, by curbing computational cost in the depth synthesis data generation processing S903. A conventional virtual slide function can be reinforced by combining the present embodiment with Embodiments 2 and 3. Deeper observation based on the Z stack image becomes possible, without defocusing of the sites of interest of the subject, through combination with Embodiment 2. Observation while changing the depth of field becomes possible through combination with Embodiment 3.

[Embodiment 5]

In Embodiments 1 to 4, instances have been explained wherein the depth extension processing S404 is performed at a previous stage to that of the development and correction processing S405, but the depth extension processing S404 may be performed, not directly after the main measurement processing S403, but after the transmission processing S408. For instance, image data having undergone imaging and having undergone development and correction processing, synthesis processing and compression processing, in the main measurement unit 101, is displayed on the image display application on the image processing apparatus 110. Effects expected to be elicited through execution of the depth-of-field extension processing explained in Embodiments 1 to 4 at high speed, on the image display application, include, for instance, enabling interactive display of extended depth-of-field images, realizing operability close to that of observation under an optical microscope, and increasing the diagnosis efficiency for the user (pathologist).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264897, filed on Dec. 2, 2012, which is hereby incorporated by reference herein in its entirety.

The invention claimed is:

1. An image processing apparatus that generates, from a plurality of first image data items obtained by imaging a subject while varying a focal position in an optical axis direction, second image data having a deeper depth of field than the first image data items, the image processing apparatus comprising:
   an imaging characteristic acquisition unit that acquires, on the basis of information that designates a depth of field for second image data to be generated, imaging characteristics of a virtual optical system having the designated depth of field;
   a determination unit that determines a synthesis focal plane corresponding to the focal position of the second image data to be generated, on the basis of the designated depth of field; and
   a generation unit that generates the second image data on the basis of the imaging characteristics acquired by the imaging characteristic acquisition unit and the synthesis focal plane determined by the determination unit.

2. The image processing apparatus according to claim 1, wherein the determination unit determines a position of the synthesis focal plane in such a manner that a largest number of objects are included within the depth of field that is centered on the synthesis focal plane.

3. The image processing apparatus according to claim 1, wherein the determination unit:
   calculates, for each of the plurality of first image data items, an image evaluation value that denotes to what degree an in-focus region is present within an image;
   calculates, for each of a plurality of focal positions, an image evaluation integration value resulting from integrating image evaluation values of the first image data within the depth of field that is centered on the focal position; and
   determines, as a position of the synthesis focal plane, a focal position at which the image evaluation integration value yields a best value.

4. The image processing apparatus according to claim 1, wherein a plurality of synthesis focal planes is set with reference to the synthesis focal plane determined by the determination unit, and second image data items respectively corresponding to the plurality of synthesis focal planes are generated.

5. The image processing apparatus according to claim 1, wherein the information designating the depth of field is information that designates an objective lens magnification, an aperture stop, or a numerical aperture.

6. The image processing apparatus according to claim 1, wherein the generation unit:
   imparts blurring to each of the first image data items according to a distance from a focal position, by using convolution processing that is based on the imaging characteristics of the virtual optical system; and
   thereafter generates the second image data by combining the first image data items imparted with blurring.

7. The image processing apparatus according to claim 1, wherein the generation unit generates the second image data through weighted addition of the first image data items on a frequency space, using weights that are determined on the basis of the imaging characteristics of the virtual optical system.

8. The image processing apparatus according to claim 1, wherein the generation unit generates the second image data by applying a filter to the first image data items on a frequency space, wherein the filter is a filter which cancels blurring that is based on imaging characteristics of an optical system used for imaging the plurality of first image data items, and which imparts blurring that is based on the imaging characteristics of the virtual optical system.

9. The image processing apparatus according to claim 1, wherein the imaging characteristics are PSF or OTF.

10. The image processing apparatus according to claim 1, wherein the plurality of first image data items is acquired for each of a plurality of divisional regions resulting from dividing the subject into a plurality of regions, and the second image data is generated for each of the divisional regions.

11. The image processing apparatus according to claim 1, further comprising a selection unit that determines, on the basis of the imaging characteristics acquired by the imaging characteristic acquisition unit, an influence range in which an influence exerted onto an image by an object that is spaced apart from the focal position in the optical axis direction is greater than a predetermined condition, and that selects first image data of which focal position is contained within the influence range, from among the plurality of first image data items, wherein
the generation unit generates the second image data using the first image data selected by the selection unit.

12. The image processing apparatus according to claim 11, wherein the selection unit sets the influence range taking, as a center, the synthesis focal plane determined by the determination unit.

13. An image processing method of generating, from a plurality of first image data items obtained by imaging a subject while varying a focal position in an optical axis direction, second image data having a deeper depth of field than the first image data items, the image processing method comprising:
an imaging characteristic acquisition step in which, on the basis of information that designates a depth of field for second image data to be generated, a computer acquires imaging characteristics of a virtual optical system having the designated depth of field;
a selection step in which, on the basis of the imaging characteristics acquired in the imaging characteristic acquisition step, the computer determines an influence range in which an influence exerted onto an image by an object that is spaced apart from the focal position in the optical axis direction is greater than a predetermined condition, and selects first image data of which focal position is contained within the influence range, from among the plurality of first image data items; and
a generation step in which the computer generates the second image data using the first image data selected in the selection step, wherein the generation step includes:
(i) a step in which the computer imparts blurring to each of the first image data items according to a distance from a focal position, by using convolution processing that is based on the imaging characteristics of the virtual optical system, and thereafter generates the second image data by combining the first image data items imparted with blurring;
(ii) a step in which the computer generates the second image data through weighted addition of the first image data items on a frequency space, using weights that are determined on the basis of the imaging characteristics of the virtual optical system; or
(iii) a step in which the computer generates the second image data by applying a filter to the first image data items on a frequency space, wherein the filter is a filter which cancels blurring that is based on imaging characteristics of an optical system used for imaging the plurality of first image data items, and which imparts blurring that is based on the imaging characteristics of the virtual optical system.

14. An image processing method of generating, from a plurality of first image data items obtained by imaging a subject while varying a focal position in an optical axis direction, second image data having a deeper depth of field than the first image data items, the image processing method comprising:
an imaging characteristic acquisition step in which, on the basis of information that designates a depth of field for second image data to be generated, a computer acquires imaging characteristics of a virtual optical system having the designated depth of field;
a determination step in which the computer determines a synthesis focal plane corresponding to the focal position of the second image data to be generated, on the basis of the designated depth of field; and
a generation step in which the computer generates the second image data on the basis of the imaging characteristics acquired in the imaging characteristic acquisition step and the synthesis focal plane determined in the determination step.

15. A non-transitory computer readable storage medium storing a program for causing a computer to execute each step of the image processing method according to claim 13.

16. An image processing apparatus that generates, from a plurality of first image data items obtained by imaging a subject while varying a focal position in an optical axis direction, second image data having a deeper depth of field than the first image data items, the image processing apparatus comprising:
an imaging characteristic acquisition unit that acquires, on the basis of information that designates a depth of field for second image data to be generated, imaging characteristics of a virtual optical system having the designated depth of field;
a selection unit that determines, on the basis of the imaging characteristics acquired by the imaging characteristic acquisition unit, an influence range in which an influence exerted onto an image by an object that is spaced apart from the focal position in the optical axis direction is greater than a predetermined condition, and that selects first image data of which focal position is contained within the influence range, from among the plurality of first image data items; and
a generation unit that generates the second image data using the first image data selected by the selection unit, wherein the generation unit:
(i) imparts blurring to each of the first image data items according to a distance from a focal position, by using convolution processing that is based on the imaging characteristics of the virtual optical system, and thereafter generates the second image data by combining the first image data items imparted with blurring;
(ii) generates the second image data through weighted addition of the first image data items on a frequency space, using weights that are determined on the basis of the imaging characteristics of the virtual optical system; or
(iii) generates the second image data by applying a filter to the first image data items on a frequency space, wherein the filter is a filter which cancels blurring that is based on imaging characteristics of an optical system used for imaging the plurality of first image data items, and which imparts blurring that is based on the imaging characteristics of the virtual optical system.

* * * * *